Inventor
William A. Barker
By his Attorney
Thomas J Ryan

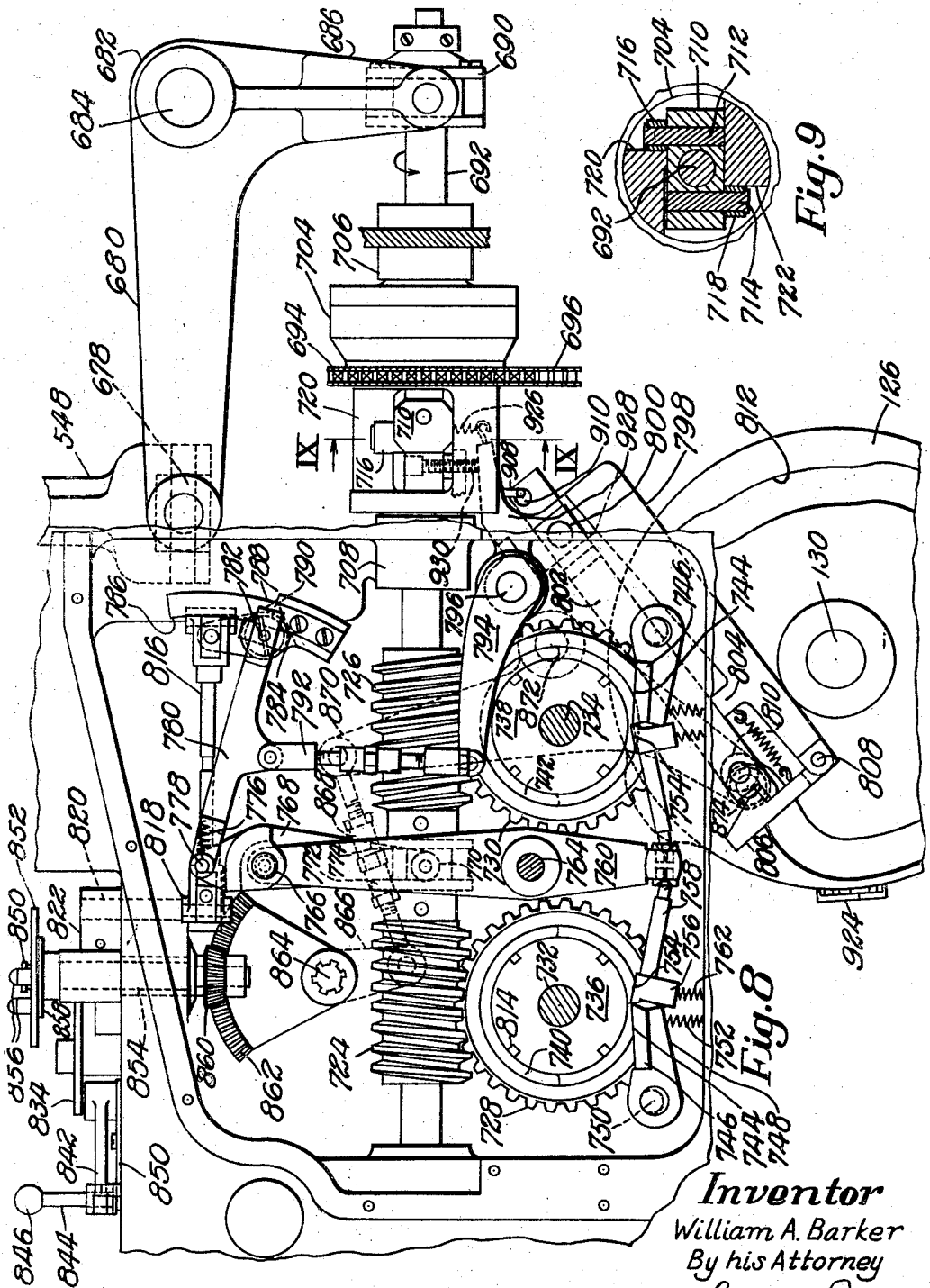

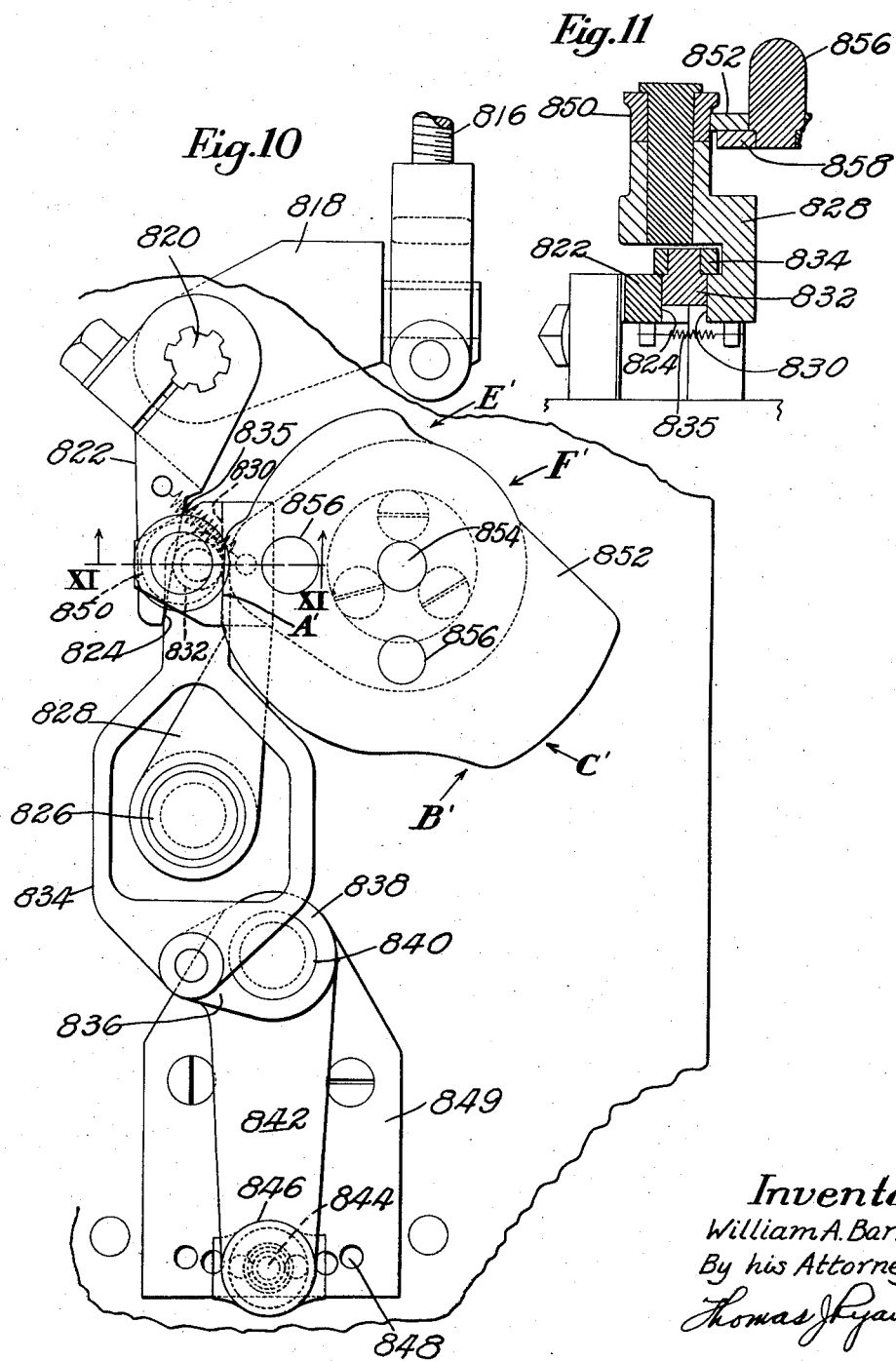

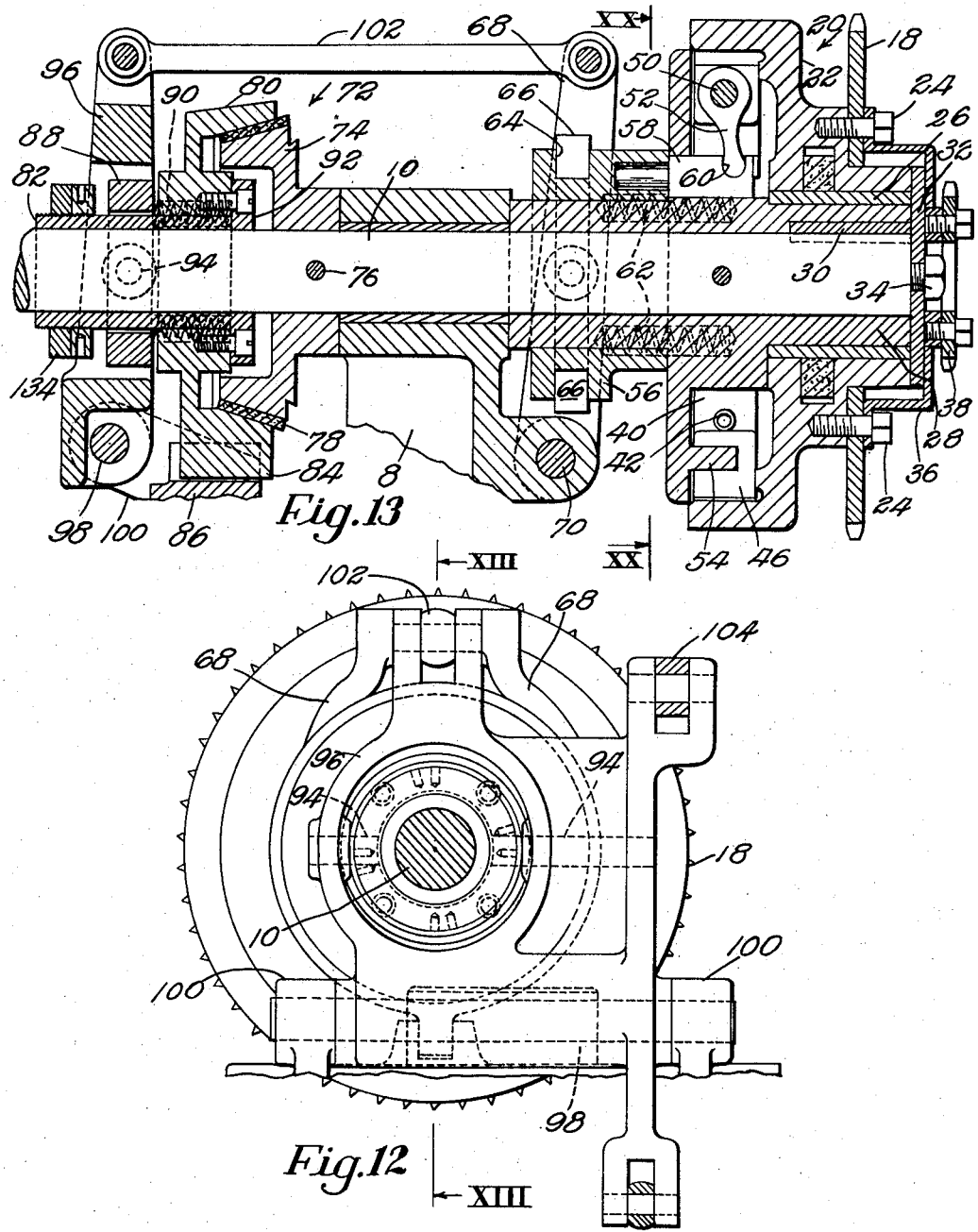

Oct. 14, 1958 W. A. BARKER 2,855,616
LEVELING MACHINES
Filed May 11, 1954 13 Sheets-Sheet 11
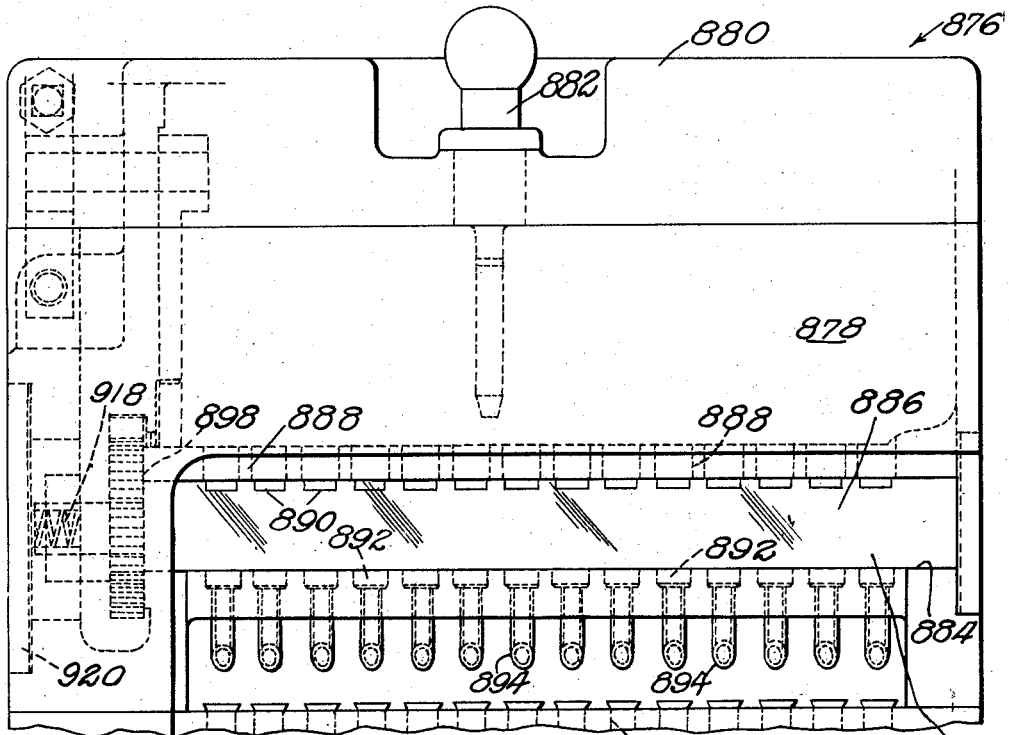
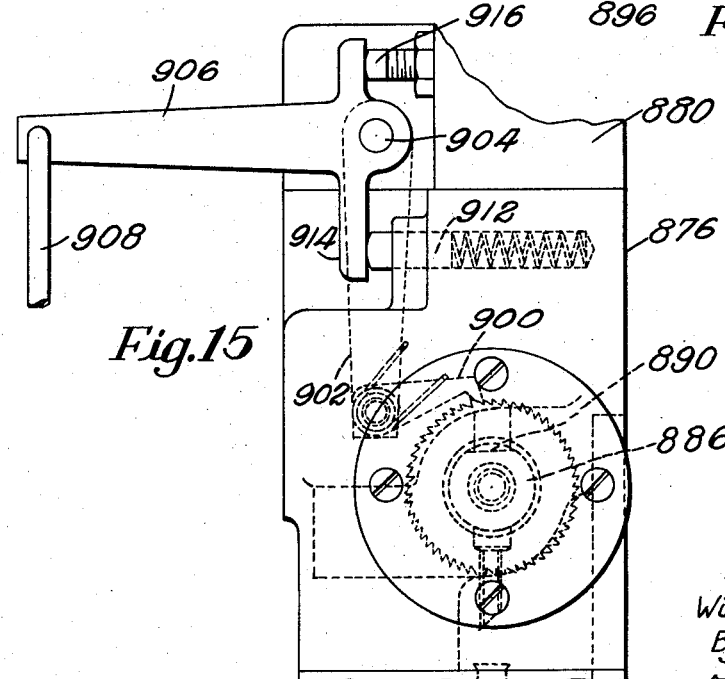
Inventor
William A. Barker
By his Attorney
Thomas J. Ryan Oct. 14, 1958  W. A. BARKER  2,855,616
LEVELING MACHINES
Filed May 11, 1954  13 Sheets-Sheet 12

Inventor
William A. Barker
By his Attorney
Thomas J. Ryan.

Oct. 14, 1958    W. A. BARKER    2,855,616
LEVELING MACHINES
Filed May 11, 1954    13 Sheets-Sheet 13
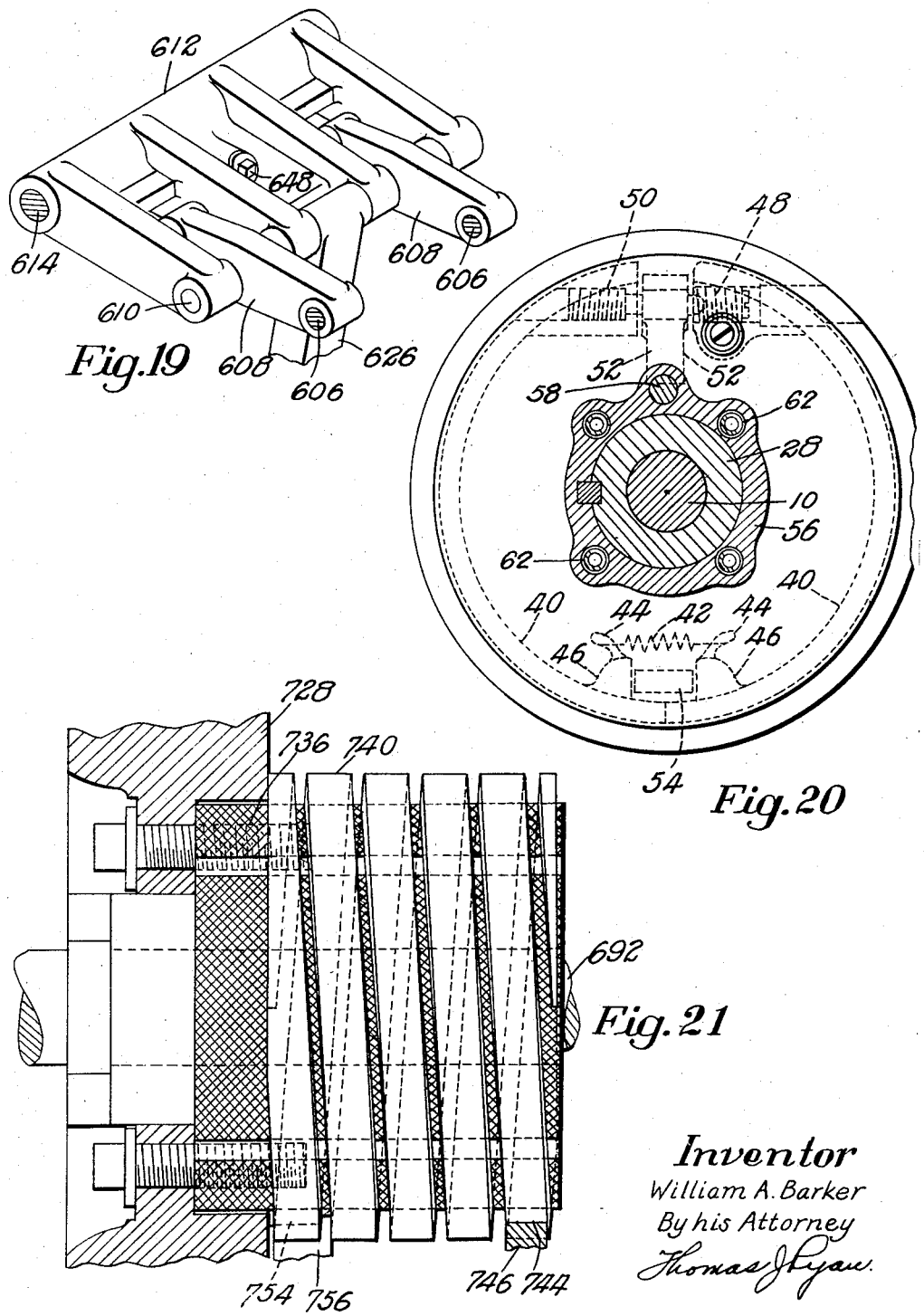
Inventor
William A. Barker
By his Attorney

United States Patent Office 2,855,616
Patented Oct. 14, 1958

2,855,616

LEVELING MACHINES

William Arthur Barker, Leicester, England, assignor to United Shoe Machinery Corporation, Flemington, N. J., a corporation of New Jersey Application May 11, 1954, Serial No. 429,070

Claims priority, application Great Britain August 31, 1953

7 Claims. (Cl. 12—34.5)

This invention relates to machines for operating on shoes, and more particularly to machines for shaping or leveling the bottoms of shoes. The invention is illustrated in a machine of the type having a leveling tool, a shoe support, a power operated means for effecting relative movements of the shoe support and the leveling tool in opposite directions lengthwise of a shoe on the support to cause the tool to operate progressively along the shoe bottom.

An object of the invention is to provide in a machine of this type improved mechanism for controlling automatically the cycle of operations of the machine both as to the aforementioned relative movements of the shoe support and the leveling tool and as to relative tipping movements between the shoe and the leveling tool to cause the tool to be tipped at different inclinations in operating upon different portions of the shoe bottom.

To this end and in accordance with a feature of the invention, the relative tipping movements of the shoe support and of the leveling tool are controlled at least in part by a removable template located in a position convenient to the operator, the template being readily replaceable by a template of a different shape so that the tipping movements will be such as to accommodate shoes of different styles. For accommodating shoes of different sizes provision is made for varying the extents of the tipping movements effected by a particular template.

As illustrated herein the shoe support is movable forwardly and rearwardly relative to the leveling tool, the movements being controlled by an eccentric. When the tool is operating in the vicinity of the ball line it is desirable to move the shoe support relatively slowly and to this end and in accordance with a further feature of the invention, the action of the eccentric is modified by a cam to effect this result.

During the leveling operation the leveling tool is forced downwardly against the shoe bottom by compression springs. In order that the desired pressure may be applied to the particular shoe being operated upon, provision is made in accordance with a still further feature of the invention for quickly adjusting the effectiveness of the springs by manipulation of a control member accessible to the operator and effective only with the jack in its loading position prior to the leveling operation. A thrust member acts through the springs to force the leveling tool against the shoe bottom, the thrust member being moved by a lever to which the thrust member is adjustably connected, the arrangement being such that adjustment of the connection between the thrust member and the lever may be made only with the jack in its loading position.

A novel gage mechanism and shoe supporting means disclosed but not claimed herein, whereby a shoe on the support is oriented relative to the leveling tool, constitute the subject matter of my copending divisional application Serial No. 725,865, filed April 2, 1958.

The above and other features of the invention including novel combinations of parts and details of construction will now be described by reference to the accompanying drawings and pointed out in the claims.

In the drawings,

Fig. 8 is a side elevation of mechanism for tipping the leveling roll;

Fig. 9 is a section on the line IX—IX of Fig. 8;

Fig. 10 is a plan view of the mechanism of Fig. 8;

Fig. 11 is a section on the line XI—XI of Fig. 10;

Fig. 12 is a front elevation of the clutch mechanism associated with the main drive shaft of the machine;

Fig. 13 is a section on the line XIII—XIII of Fig. 12;

Fig. 14 is a side elevation of lubricating mechanism incorporated in the machine;

Fig. 15 is an end elevation of the lubricating mechanism of Fig. 14;

Fig. 19 is an angular view of a portion of the roll actuating mechanism;

Fig. 20 is a section on the line XX—XX of Fig. 13; and

Fig. 21 is a detail view, partly in section, of a brake mechanism associated with the machine.

Figure 1:
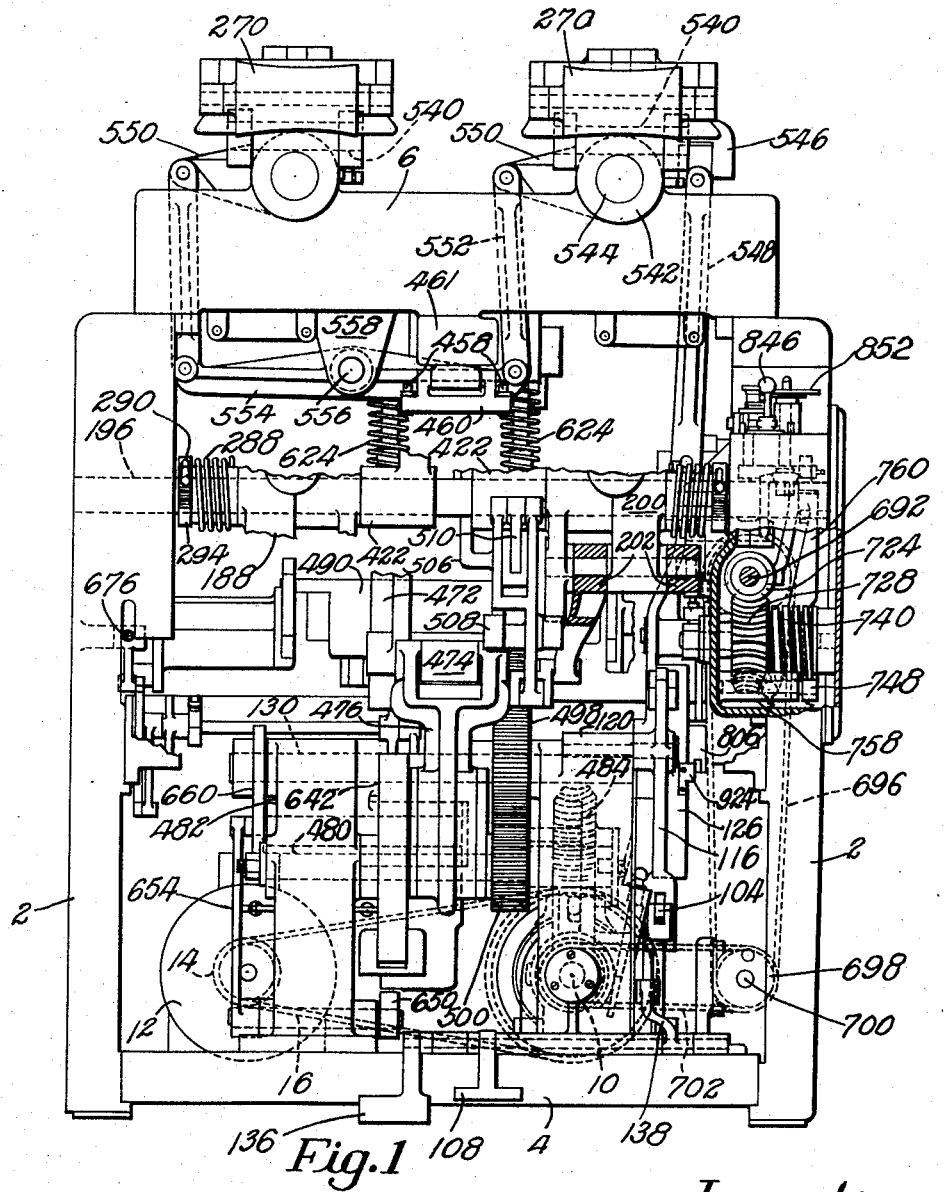
Fig. 1 is a front elevation, partly in section, of one form of machine embodying the invention.

The machine is illustrated as a two-station leveling machine having a frame composed of side members 2, 2, a base 4 and a head 6 connecting the side members. Journaled in bearings 8 (Fig. 2) carried by the base is a forwardly and rearwardly extending drive shaft 10 arranged to be driven by an electric motor 12 (Fig. 1). This motor carries a drive sprocket 14 connected by a sprocket chain 16 to a driven sprocket 18 journaled on the rear end of the shaft 10 (Fig. 13) and arranged to be connected thereto by a clutch 20. The clutch 20 includes a flanged drive member 22 to which the sprocket 18 is secured by screws 24. The drive member 22 is journaled on a bushing 26 surrounding a driven member 28 keyed at 30 to the shaft 10. A plate 32 secured by a screw 34 to the rear end of the shaft 10 maintains the parts in assembled relation on the shaft with the forward end of the driven member 28 in engagement with the adjacent bearing 8. A cup-shaped housing 36 is secured by the screws 24 to the sprocket 18 and carries a small drive sprocket 38 for a purpose to be hereinafter described.

Within the flanged portion of the drive member 22 of the clutch is a split ring composed of a pair of ring members 40 (Fig. 20) adjacent portions of which are held in abutting relation by a spring 42 connected to ears 44 carried by abutments 46 extending inwardly from the ring-shaped members. The other end of one of the ring members 40 carries an abutment screw 48 having a semi-spherical recess in its end into which is seated the round end of a screw threaded member 50 carried by the other half of the split ring. Secured to the threaded member 50 is an arm 52 arranged to be swung as will be described to turn the threaded member 50 in one direction or the other. When the screw threaded member 50 is turned in a direction causing the upper ends of the split ring to separate the ring is forced into driving engagement with the flange of the driven member 22 thus imparting movement through the abutments 46 to an arm 54 of the driven member 28 to rotate the shaft 10. Upon movement of the arm 52 in the opposite direction the screw threaded member 50 is turned to permit the adjacent end portions of the split ring to approach each other thus moving out of driving engagement with the drive member 22.

Surrounding a forwardly extending portion of the driven member 28 of the clutch is a clutch actuating member 56 which is arranged for sliding movement with respect to the driven member 28. Carried by the clutch actuating member 56 and extending rearwardly between the clutch members is an arm 58 having a recess 60 to receive the adjacent portion of the arm 52. Springs 62 act between the driven member 28 of the clutch and the clutch actuating member 56 to urge the clutch actuating member forwardly whereupon the arm 52 moves the screw threaded member 50 in a direction to engage the clutch members. The clutch actuating member 56 is provided with an annular groove 64 to receive a pair of blocks 66 pivotally carried by clutch actuating arms 68. These arms are pivoted at their lower ends on coaxial studs 70 carried by rearwardly extending bosses in the adjacent bearing 8. Movement of the arms 68 in a clockwise direction, as shown in Fig. 13, causes movement of the arm 52 in a counterclockwise direction to turn the screw threaded member 50 in a direction to cause disengagement of the clutch.

Provision is made for applying a brake to the shaft 10 when the clutch is disengaged. For this purpose a brake 72 comprising a cone-shaped brake member 74 secured by a pin 76 to the shaft 10 is provided. The brake member 74 is provided with a band of friction material 78 with which coacts the internal surface of a brake drum 80 mounted on a sleeve 82 and provided with a downwardly extending portion 84 slidable forwardly and rearwardly in a groove in a block 86 secured to the base of the machine. Thus the brake drum 80 may move along the drive shaft 10 but is prevented from rotating with the shaft so that upon rearward movement along the shaft it coacts with the brake member 74 to arrest motion of the drive shaft. A collar 88 surrounds the sleeve 82 and is positioned in front of the drum 80. Compression springs 90 act between the collar 88 and a plate 92 secured to the rear face of the brake drum 80 to provide a yielding connection between these members. The collar 88 is pivotally mounted on coaxial pins 94 carried by a brake lever 96 the lower end of which is pivoted on a horizontal shaft 98 carried by bosses 100 extending forwardly from the block 86. The brake lever 96 is connected by a link 102 to the clutch actuating arms 68 so that upon movement of the clutch actuating arms to disengage the clutch, the brake drum 80 is moved into engagement with the brake member 74 to arrest movement of the drive shaft.

Pivotally connected to a lateral extension of the brake lever 96 is a forwardly extending clutch trip rod 104 (Fig. 2) the forward end of which is pivoted to the upper end of a link 106. The lower end of the link 106 is pivoted to a rearwardly extending arm of a treadle 108 pivoted at 110 to the base of the machine. Upon depression of the treadle 108 the forward end of the clutch trip rod is raised about its pivotal connection to the brake lever 96 causing engagement of the clutch as will hereinafter appear.

Secured to the underside of the clutch trip rod 104 near its forward end is a block 112 the front end face of which is engaged by a plate 114 secured in a fork on the lower end portion of a cam lever 116 to hold the clutch disengaged and the brake applied. The cam lever 116 is pivoted on a pin 118 carried by a boss extending upwardly from a housing 120. The cam lever 116 has an upwardly extending arm 122 carrying a cam roll 124 held against the surface of a cam 126 by a tension spring 128 connected to the lower end of the lever 116 and to the frame of the machine. The cam 126 is carried by a cam shaft 130 journaled in the frame above the drive shaft 10.

Figure 2:
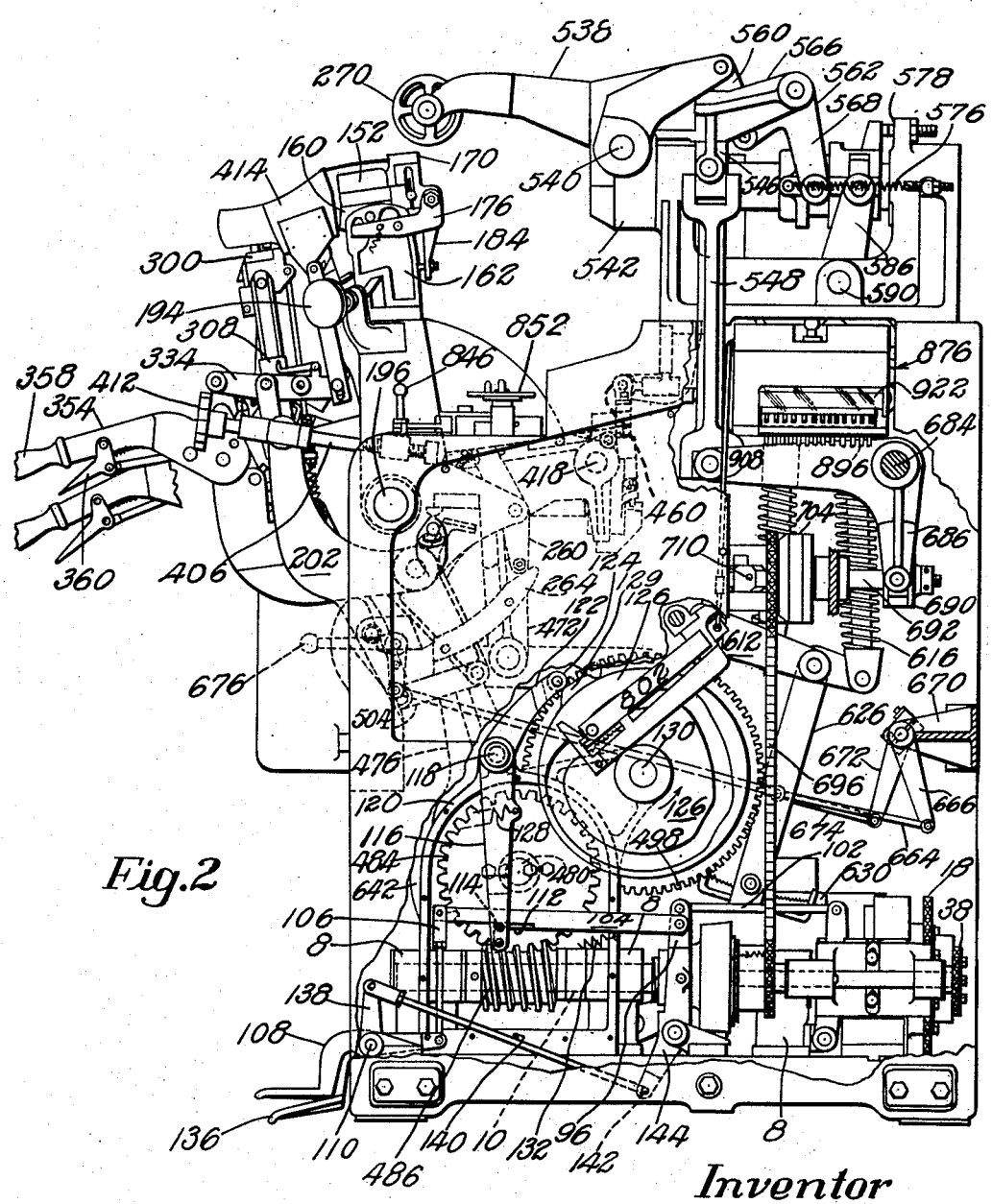
Fig. 2 is a right elevation, partly in section, of the machine.

With the machine at rest the cam roll 124 is engaged with a high portion 129 of the cam 126 and the plate 114 carried by the lower end of the cam lever 116 holds the clutch trip rod 104 in the position shown in Fig. 2 in which the clutch is disengaged and the brake is holding the shaft 10 in its rest position. To initiate a cycle of operations of the machine, the treadle 108 is depressed lifting the clutch trip rod 104 whereupon the block 112 is moved above the plate 114, and a spring 132 connected to the trip rod 104 moves this rod forwardly, thus moving the brake lever 96 and the clutch lever 68 forwardly. The brake lever moves forwardly until the collar 88 engages an adjustable ring 134 threaded on the forward end of the sleeve 82 and upon further forward movement the sleeve 82 moves forwardly carrying the brake drum 80 out of braking engagement with the brake member 74 thus releasing the brake and permitting rotation of the shaft 10. During movement of the collar 88 toward the ring 134 the clutch lever 68 and the clutch actuating member 56 are moved forwardly by the connections to the brake lever 96 and the springs 62 in the clutch actuating member. This causes rotation of the screw member 50 in a direction to cause engagement of the clutch which occurs just after release of the brake 72. As soon as the machine starts to operate, the treadle 108 is released, the high part 129 of the cam 126 moving out of engagement with the cam roll 124 whereupon the cam lever 116 is swung in a clockwise direction by the tension spring 128 so that the plate 114 carried by the lower end of the cam lever is positioned to engage the block 112 on the clutch trip rod 104 when the high part of the cam moves back into engagement with the cam roll 124, rocking the cam lever in a counterclockwise direction. Upon this happening at the end of the machine cycle, the clutch is disengaged and the brake is applied as heretofore explained thus bringing the drive shaft 10 to rest.

It may be desirable to disengage the clutch and stop motion of the drive shaft 10 prior to the completion of a cycle of operation of the machine. For this purpose a stop treadle 136 is pivoted at 110 adjacent to the treadle 108. This stop treadle has an upwardly extending arm 138 to which is connected one end of a link 140, the other end of which is connected at 142 to an arm 144 extending downwardly from the brake lever 96. By depressing the treadle 136 the link 140 is moved forwardly causing clockwise movement of the brake lever 96 and similar movement of the clutch lever 68 whereupon the clutch is disengaged and the brake is applied to the shaft 10, as heretofore explained. Upon releasing the treadle 136 the clutch and brake levers are moved in counterclockwise directions whereupon the drive shaft 10 starts rotating again. Thus it is possible to interrupt the leveling operation at any time during the cycle.

Figure 3:
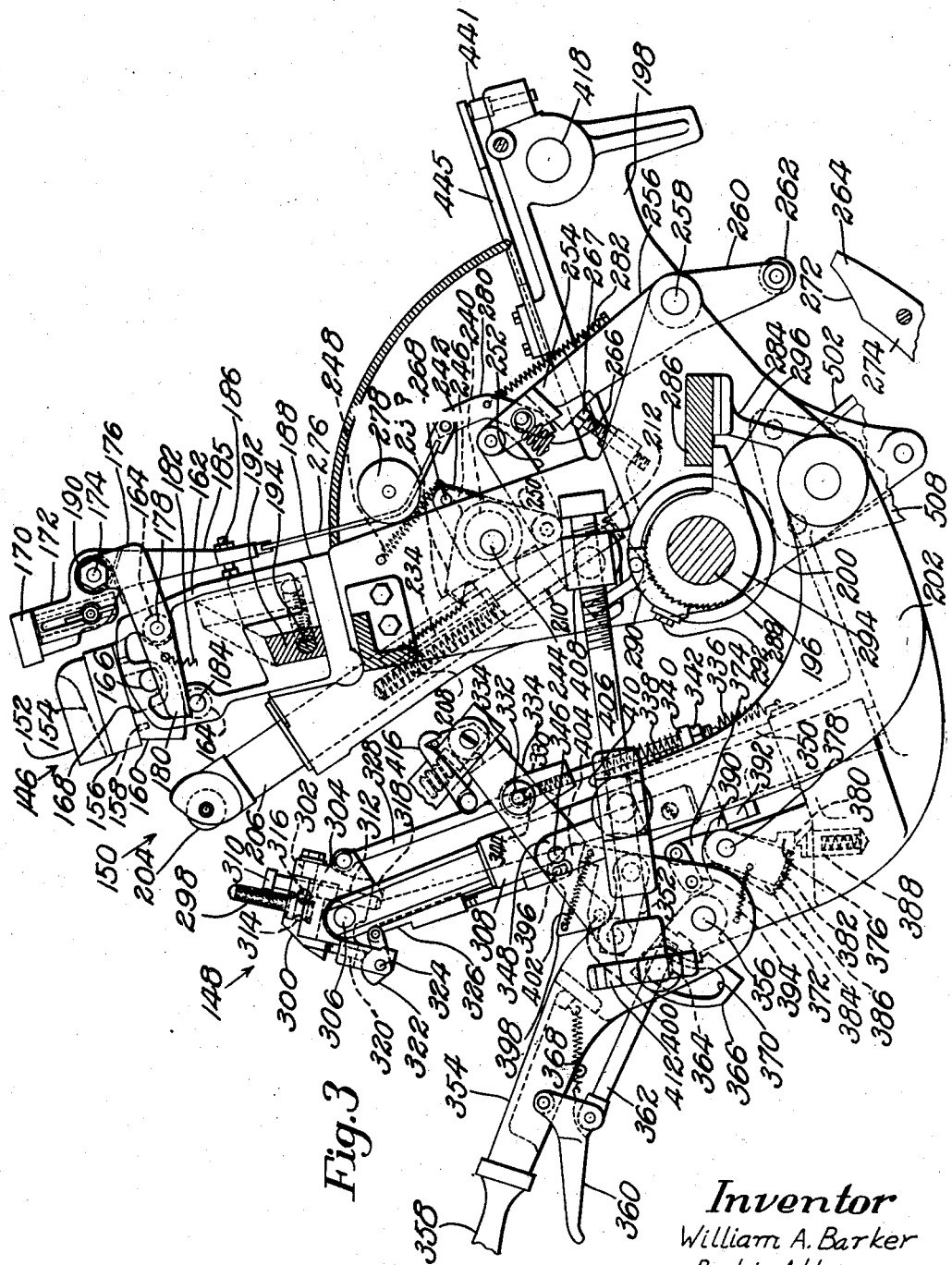
Fig. 3 is a right elevation, partly in section, illustrating one of the jacks in a forward position to receive a shoe.

As illustrated herein the machine is provided with a pair of shoe supporting jacks one of which is shown in Fig. 3, these jacks being arranged to swing rearwardly and forwardly to carry a shoe thereon beneath a leveling roll. Each jack comprises a toe support 146, a heel support 148 and a cone support 150.

The toe support 146 comprises a rubber pad 152 having a recess 154 shaped to conform to the toe portion of a shoe. The pad 152 is carried by a plate 156 having a pair of downwardly extending pins 158 fitting into holes in a block 160. The pad 152 and the plate 156 may be removed from the block 160 merely by lifting them whereby they are readily replaced if desired by an assembly having a toe pad with a differently shaped recess.

The block 160 is carried for rocking movement whereby the pad accommodates itself to the toe end of the shoe. For this purpose the block is mounted between side walls of an adjustable support 162 between the sides of which are journaled rolls 164 on which rests the curved bottom face of the block 160, so that the block and the toe pad may rock forwardly or rearwardly. The amount of rocking movement is limited by a pin 166 engageable with the sides of a recess 168 formed in the block 160. Engagement of this pin with the bottom of the recess prevents the block from being lifted from the adjustable support 162.

The lengthwise position of the shoe with respect to the toe support is controlled by a toe gage 170. This gage is carried for heightwise adjustment in a holder 172 which is pivotally mounted at 174 on the rearward end of a lever 176. This lever is pivoted on a pin 178 which carries the rear block supporting roll 164 and has a forwardly extending arm 180 which is normally held by a spring 182 against a pin 184 carrying the forward block supporting roll 164. The toe gage holder 172 has a downwardly extending arm 185 carrying an adjustable stop screw 186 which is normally held in engagement with a jack post 188 by a torsion spring 190. It will be understood that by adjusting the stop screw 186 the position of the gage lengthwise of the toe support may be readily adjusted. At an opportune time at the beginning of the cycle of operations of the machine the lever 176 is moved in a clockwise direction about the pivot 178 to move the toe gage 170 downwardly to avoid interference with the leveling roll as will be hereinafter explained.

The adjustable support 162 for the toe pad is mounted at the upper end of the jack post 188 for heightwise adjustment, the heightwise position of the support being controlled by a wedge 192 between the jack post and the adjustable support and arranged to be adjusted by a hand screw 194. The jack post 188 is mounted for rocking movements on a horizontally extending shaft 196 extending laterally of the machine near the front thereof. The jack post has a rearwardly extending arm 198 arranged to be connected to mechanism for rocking the jack during the leveling operation as will be described. The jack post also includes a downwardly extending arm 200 to which is pivotally connected a heel post 202.

The cone support 150 is arranged to support the cone of a last during the leveling operation and includes a rubber cone engaging block 204 carried at the upper end of a spindle 206 slidable in the jack post 188 and being inclined forwardly and upwardly relatively to the jack post. The spindle 206 is normally urged upwardly by a compression spring 208 contained in a bore in the spindle 206, the lower end of the spring being supported by a plunger 210 in the bore, the lower end of the plunger engaging a face 212 on the jack post 188.

Figure 17:
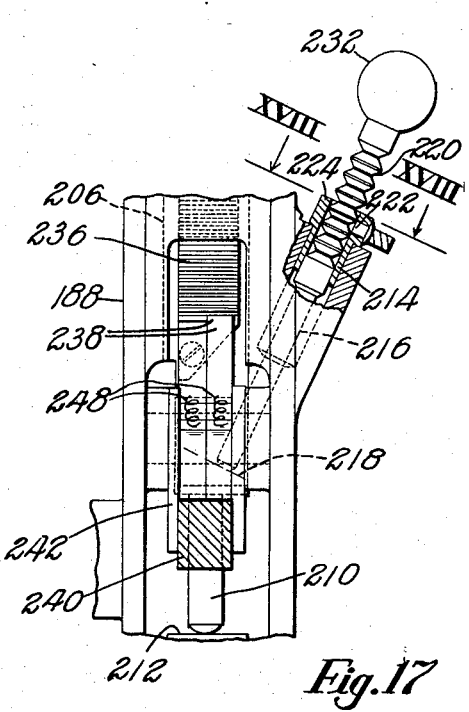
Fig. 17 is a detail view of a portion of one of the jacks.
Figure 18:
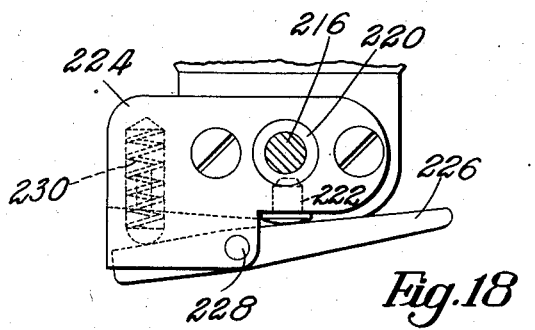
Fig. 18 is a section on the line XVIII—XVIII of Fig. 17.

Upward movement of the spindle 206 by the spring 208 is adjustably controlled by mechanism best shown in Fig. 17. Slidably mounted in a sleeve 214 in the jack post is a rod 216 the lower end of which engages a face 218 provided by a recess formed in the lower end of the spindle 206. The upper end of the rod 216 is provided with a series of notches 220 with which cooperates a plunger 222 extending through a bore in a flange 224 on the upper end of the sleeve 214 to lock the rod 216 in any one of a plurality of positions. The plunger 222 is normally held in locking engagement with one of the notches 220 by a lever 226 (Fig. 18) pivoted at 228 on the flange 224. The lever 226 is normally held in the position illustrated by a compression spring 230 with the plunger 222 in locking position. The upper end of the rod 216 is provided with a knob 232 by which the rod may be adjusted upwardly or downwardly when the lever 226 is moved by the operator to release the plunger 222. The pressure exerted by the plunger against the rod is sufficient to prevent upward movement of the spindle 206 by the spring 208 but permits the rod to move upwardly should the face 218 on the spindle be in engagement with the rod 216 if, for example, there is no shoe on the jack and the last cone spindle is moved positively upwardly, as will be explained.

Provision is made for moving the cone support upwardly a slight amount after the shoe has been placed on the jack and the jack is moved rearwardly prior to the start of a leveling operation, thus affording adequate protection to the last against breakage under the force exerted by the leveling roll. For this purpose the spindle 206 for the cone support has secured to it at its rear side a ratchet block 234 having ratchet teeth 236. Cooperating with the teeth 236 is a pair of pawls 238 arranged side by side, one of the pawls having a tooth half the distance between successive ratchet teeth 236 in advance of the other.

The pawls are pivoted on an eccentric 240 extending laterally of the machine behind the spindle 206 and below the teeth on the pawls which are confined between side plates 242 secured to the eccentric 240. This eccentric is rotatable on a horizontal shaft 244 carried by the jack post 188. Each pawl has a rearwardly extending arm 246 between which and the post 188 is connected a tension spring 248. These springs urge the teeth of the pawls toward the ratchet teeth which are shaped to prevent downward movement of the spindle 206. The side plates 242 each has a downwardly extending arm 250 and between the arms is pivoted the forward end portion of a link 252, the rearward end of which is pivoted to the upper end portion of an arm 254 of an actuating lever 256 pivoted at 258 to the jack post 188. The lever 256 has a downwardly extending arm 260 carrying a cam roll 262 arranged upon rearward swinging movement of the jack to engage a cam 264 secured to the frame of the machine.

Each of the jacks of the machine may assume a position at the end of a cycle of operations in which it is in a well forward position as shown in Fig. 3 to enable a hand operation to be performed on the shoe if desired or each may be stopped in a more rearward position as shown in Fig. 2 in which the toe end of the shoe is adjacent to the leveling roll. With the jack in either of these positions a tension spring 266 connected to the upper arm of the lever 256 and to the jack post 188 holds the upper arm of the lever in a forward position against an adjustable stop screw 267 carried by the jack post. The upper end portions of the side plates 242 are connected by a pin 268 which is engaged by the rearwardly extending arms 246 of the pawls 238 to hold the pawls out of engagement with the teeth 234 of the ratchets carried by the cone support spindle 206. The eccentric 240 will assume the position shown in Fig. 3 with the jack in its forward position.

If the jack is in its forwardmost position at the end of a cycle of operations it is moved back to the position shown in Fig. 2 by the operator before the machine is started. In this position the toe end of the sole of the shoe is located slightly ahead of a leveling roll 270 and the cam roll 262 (Fig. 3) on the lever 256 is in or nearly in engagement with a portion 272 of the fixed cam 264. Upon further movement of the jack by the power operation of the machine to be described, engagement of the cam roll 262 with the inclined portion 272 of the cam causes the lever 256 to move in a clockwise direction, as viewed in Fig. 3. This movement of the lever 256 causes a counterclockwise movement of the side plates 242 whereupon the pin 268 moves away from the rearwardly extending portions 246 of the pawls 238 and the tooth of one of the pawls is moved by its spring 248 into engagement with the ratchet teeth. As the side plates 242 move in a counterclockwise direction the eccentric 240 is turned to move the pawls upwardly which, because of the engagement of one of them with a tooth of the ratchet, cause upward movement of the spindle 206 causing the block 204 to press firmly into engagement against the last, and the spindle is locked by the pawl against downward movement during operation of the machine on a shoe. The extent of this upward movement of the spindle 206 may be adjusted by the adjustment of the stop screw 267 which determines the position of the lever 256 with the jack in its forward or loading position, and as pointed out it makes no difference in which of the two forward positions the jack is located. This upward movement of the spindle 206 occurs just prior to engagement of the shoe by the leveling roll 270. During the leveling operation the cam roll 262 moves along a path 274 of the cam 264 which is concentric with respect to the shaft 196 about which the jack post moves so that the spindle 206 is locked in its upper position during the leveling operation.

For moving the toe gage 170 down at the beginning of the leveling operation the arm 185 of the support for the gage is connected by a chain or suitable flexible connection 276 passing around a guide pulley 278 with a lever 280 pivoted to the arm 254 of the lever 256. A spring 282 connected between the levers 280 and 256 maintains the chain 276 taut. Upon movement of the lever 256 in a clockwise direction during rearward movement of the jack, as heretofore explained, the toe gage 170 is moved downwardly through the aforementioned connections against the action of the spring 182. The forwardmost position of the jack is determined by the engagement of a leather-covered lug 284 on the jack post 188 with a lug 286 on the frame of the machine.

To assist the operator in moving the jack rearwardly from its forwardmost position into the position of Fig. 2, the weight of the jack is substantially balanced by a torsion spring 288 one end of which engages the jack and the other end of which engages an adjustable block 290 secured by a screw 292 to a member 294 mounted on the shaft 196. The member 294 has a rearwardly extending arm 296 engageable with the lug 286. The block 290 and the member 294 have interengaging teeth to prevent relative slipping movement between them. The spring is so arranged that the jack as it moves forwardly tensions the spring and the extent of this tension is adjusted by varying the position of the block 290 on the member 294.

Carried by the upper end of the heel post for forward and rearward as well as lateral movements is a last pin 298 arranged to be received by the thimble in the heel end of a last. The last pin is mounted in a holder 300 carrying a rearwardly extending pin 302 rotatably mounted in a block 304 pivoted at 306 to the upper end portion of a block supporting post 308 mounted in the heel post 202. Thus the last pin can swing forwardly and rearwardly about the pin 306 and laterally about the axis of the pin 302. Slidably mounted in the holder 300 is a last supporting pin 310 arranged to engage the forward portion of the heel end of the last. The lower end of the last supporting pin 310 rests on the upper end of a pin 312 slidably mounted in the block 304, the arrangement being such that the last supporting pin 310 can move relatively to the pin 312 when the last pin 298 moves laterally about the axis of the pin 302.

The lower end of the last pin has an annular groove 314 engaged by a ball 316 in the last pin holder 300. The ball is held in the groove 314 by the last supporting pin 310 so that when the last supporting pin is withdrawn from the holder the last pin 298 may be withdrawn from the holder and replaced with a pin of the desired size. The lower end of the pin 312 rests on a face 318 of the block supporting post 308. The holder 300 is locked in its laterally tilted position by a plunger 320 the upper end of which has an arcuate toothed surface arranged to engage a correspondingly toothed surface on the lower face of the holder 300. The lower end of the plunger 320 is engaged by a cam 322 pivoted at 324 on a downwardly extending arm of the block 304. The cam 322 has a rearwardly extending arm pivotally connected to the upper end of a rod 326. Pivotally connected to the block 304 is the upper end of a downwardly extending rod 328, the lower portion of which passes downwardly between the arms of a yoke member 330. The upper end portions of the arms of the yoke are pivoted on a horizontal spindle 332 secured in the rearwardly extending arms of a pair of last pin actuating levers 334, the yoke lying between these arms. The lower end of the rod 328 has connected to it a tension spring 336 the lower end of which is connected to the heel post 202. This spring urges the last pin 298 rearwardly into the position shown in Fig. 3. Surrounding the lower end of the rod 328 is a compression spring 338 the lower end of which rests on a block 340 adjustably supported by a nut 342 threaded on the lower end of the rod 328. Upon placing a last on the last pin 298, the toe end thereof is moved upwardly and swung over the toe rest 152 and placed thereon. During this movement of the toe end of the shoe the last pin is swung forwardly from the position shown in Fig. 3 causing the rod 328 to be raised and bringing the upper end of the compression spring 338 close to the undersurface of the yoke member 330. For a purpose to be described, the yoke member 330 may be swung rearwardly from above the spring 338 and held in this position or in the position shown in Fig. 3 by a spring plunger 344 in one of the arms of the yoke member engaging one of two recesses in the spindle 332.

The last pin actuating levers 334 are pivoted on pins 346 carried by upwardly extending lugs 348 located at opposite sides of the block supporting post 308. The lugs 348 are carried by a member 350 slidingly mounted on the post 308. Pivoted to the forwardly extending arms of the levers 334 is the front end portion of an actuating link 352. A rear end portion of this link is pivotally connected to a rearwardly and upwardly extending arm of a hand lever 354 pivotally carried by a laterally extending pin 356 secured in the heel post 202. The actuating link 352 and the arm of the hand lever 354 form a toggle which with the hand lever in a raised position, as shown in Fig. 3, is broken and is straightened upon movement of the hand lever into the lowered position shown in Fig. 2. With the hand lever 354 in its raised position it extends upwardly and forwardly from the pin 356 and is provided at its forward end with a handle 358 arranged to be gripped by the operator.

Pivoted to the hand lever 354 and extending beneath the handle 358 is a latch lever 360 to which is pivoted one end of a latch rod 362. The other end of the latch rod is guided by a hole through a stud 364 pivoted in the hand lever 354. The lower end of the rod 362 is normally held in a recess in a block 366 secured to the heel post 202 by a tension spring 368 connected to the latch lever 360 and the hand lever 354. By moving the latch lever 360 upwardly the rod 362 is withdrawn from the recess and upon movement of the hand lever 354 to its lowered position the end of the rod rides off the block and is moved by the tension spring beneath the block to lock the hand lever in its lowered position. At this time a shoulder on the rod engages an arcuate face of the block to limit the movement of the rod beneath the block. The stud 364 passes through an arcuate slot 370 in the block 366 and limits up and down movement of the hand lever 354.

Pivoted to the hand lever 354 is the front end of a link 372 the rear end of which is pivoted to the upper end portion of an arm 374 of a control lever 376. This control lever is pivoted on a pin 378 in the heel post 202 and has a downwardly extending arm the lower end of which is in the form of two arcuate faces 380, 382 located at different distances from the pivot 378 and joined by an inclined face. Also pivoted on the pin 378 is a ratchet lever 384 having a downwardly extending arm provided with rearwardly facing ratchet teeth 386. Beneath the arms of the controlling and ratchet levers is a spring detent 388 arranged to be engaged either by the arcuate face 380 of the controlling lever or by the ratchet teeth. The ratchet lever is provided with a rearwardly extending arm 390 engageable with a block 392 carried by the aforementioned sliding member 350 on the block supporting post 308, and is so held by a tension spring 394.

With the parts positioned as illustrated in Fig. 3, the last engaging members on the heel post are in positions to receive a last and shoe. In placing the shoe on the jack, the thimble is placed over the last pin and the toe of the shoe is lifted so that it can be placed on the toe rest. This causes the last pin to be swung forwardly against the tension of the aforementioned spring 336. The rod 328 is lifted and with it the compression spring until the spring is just below the yoke member 330. With the last and shoe supported on the heel pin and on the toe rest, the hand lever 354 is moved down whereupon the toggle formed by the hand lever and the link 352 straightens causing the actuating levers 334 to turn about their pivotal connection 346 to the sliding member 350 until the resistance offered by the shoe through the last pin and rod causes the actuating levers to turn about their pivotal connection to the yoke member 330 thereby raising the sliding member 350. As this member rises, the block 392 thereon which engages beneath the arm 390 extending rearwardly from the ratchet lever 384, swings the ratchet lever in a counterclockwise direction, the teeth 386 moving past the detent 388 which is being held down by the controlling lever 380. Before the toggle formed by the hand lever and the link 352 is fully straightened the controlling lever 380 which has been moving in a counterclockwise direction as the hand lever has been moved down, arrives in such position that the detent is allowed to engage one of the ratchet teeth to lock the ratchet lever 384 against further counterclockwise movement and thus to lock the sliding member 350 against further upward movement. During the last part of the downward movement of the hand lever 354 after the sliding member has been locked, the toggle straightens and the actuating levers 334 move about their pivot 346 on the sliding member 350 and through the rod 328 and the spring 338 moves the last pin rearwardly to press the toe end of the shoe firmly against the toe rest.

When the hand lever reaches its lowest position the operator releases the latch lever 360 whereupon the latch rod 362 is moved by the spring 368 beneath the block 366 on the heel post to lock the hand lever and the parts controlled thereby in position during the leveling operation. At the completion of the leveling operation the operator grips the latch lever 360 to release the latch rod 362 from the block 366 and raises the hand lever to return the parts to their starting positions.

The lower end of the rod 326 which controls the cam 322 by which the last pin holder is locked against lateral tipping movements has at its lower end a slot through which passes a pin 396 carried by an arm 398 pivoted at 400 to the link 352. The arm 398 is connected by a spring 402 to the link 352. This spring normally holds a portion 404 of the arm 398 against a face on the link 352. Upon downward movement of the hand lever 354, the toggle formed by the hand lever and the link 352 is straightened and during this straightening movement the pin 396 moves into engagement with the lower end of the slot in the rod 326 and then moves the rod downwardly to move the cam member 322 in a clockwise direction moving the plunger 320 upwardly to engage the toothed arcuate face on the last pin holder thus locking the holder against lateral movement. Following this locking of the last pin holder the arm 398 is permitted to move about its pivot against the action of the spring 402 without causing damage to the parts which have been locked against further movement.

With the parts in the positions shown in Fig. 3, the last supporting pin 310 is in a raised position. Upon swinging the last pin 298 forwardly about its pivot 306 as the toe portion of the last is raised by the operator, the face 318 upon which the lower end of the pin 312 rests permits this pin and consequently the last supporting pin 310 to be pressed down by the last as the last is placed over the last pin by the operator and the last supporting pin 310 determines the heightwise position of the last on the pin 298. Upon downward movement of the hand lever 354 to force the toe end of the lasted shoe against the toe rest 146, the last pin 298 swings rearwardly and the pin 312 rides up the face 318 to press the last supporting pin 310 against the last firmly to support the heel end portion of the last against the pressure of the leveling roll.

For accommodating shoes of different sizes, the heel post 202 is adjustable toward and away from the jack post 188. For this purpose, the posts are connected by a screw 406 threaded through a block 408 on the jack post and passing through a block 410 on the heel post, the screw carrying collars at opposite sides of the block 410 to prevent lengthwise movement of the screw therethrough. The forward end of the screw carries a handle 412 by which the screw may be turned to move the heel post toward or away from the jack post.

It may be desirable to employ a stirrup or saddle 414 (Fig. 2) to hold the lasted shoe in position on the jack. In such case the yoke member 330 (Fig. 3) is swung rearwardly from above the spring 338 to free the last pin for swinging movement about the pivot 306. The stirrup 414 may be detachably connected to the last pin actuating levers 334 by yielding connections similar to those illustrated and described in Letters Patent of the United States No. 2,073,005, granted March 9, 1937, in the name of Andrew Eppler. Upon removal of the stirrup 414 the yielding connections may be held in inoperative positions by a latch 416 (Fig. 3). The stirrup disclosed herein does not cover the entire shoe bottom as in the aforementioned patent but covers only the shank portion of the shoe. A stirrup of such width is more effective to hold the shank portion of the shoe bottom against the last than one which covers the forepart and heel seat. The mechanism operates in the manner above described except that the saddle is pulled firmly against the shoe to press the toe end of the shoe against the toe rest instead of relying upon rearward tipping movement of the last pin.

Figure 4:
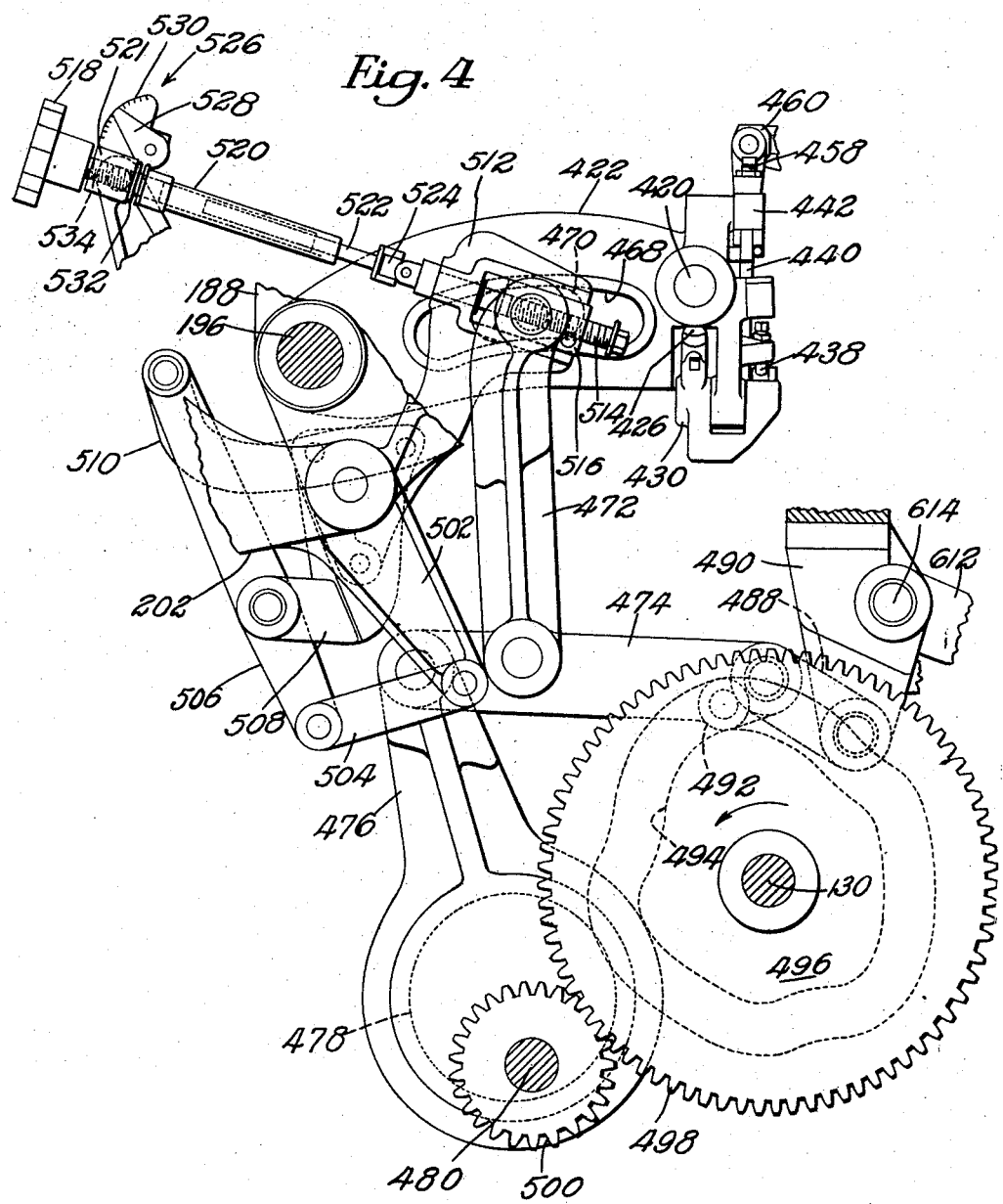
Fig. 4 is a right elevation, partly in section, of mechanism by which the jack is actuated to carry the shoe forwardly and rearwardly beneath a leveling roll.
Figure 5:
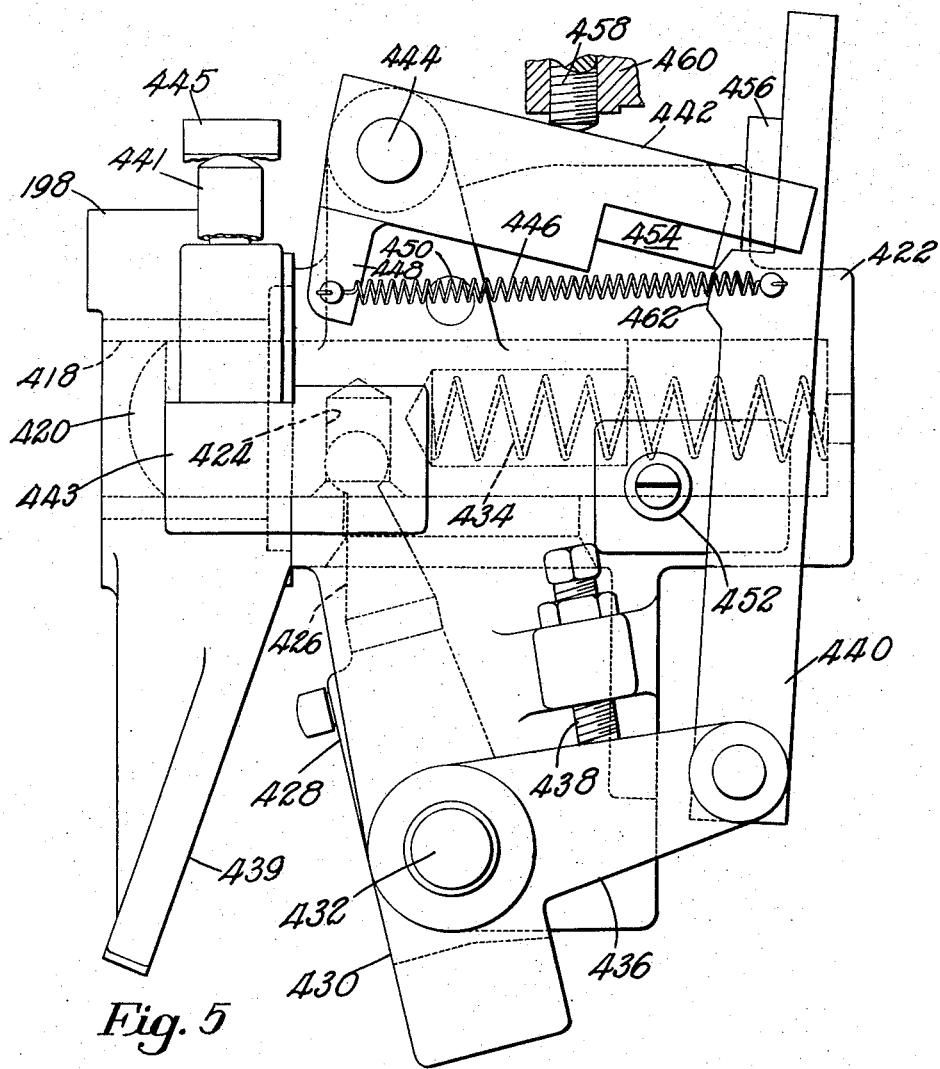
Fig. 5 is a detail of a portion of the jack-actuating mechanism, this view being taken at right angles to Fig. 4.

For connecting the jack to power operated mechanism by which forward and rearward movements of the jack are effected during the leveling operation, the rearwardly extending arm 198 is provided with a hole 418 to receive an end portion of a bolt 420 (Figs. 4 and 5) slidingly mounted in a jack rocking arm 422 which is pivoted on the shaft 196 by which the jack post 188 is carried, the arm extending rearwardly from the shaft at one side of the rearwardly extending arm 198. The bolt 420 has extending upwardly into it a recess 424 which receives the upper ball-shaped end of a stud 426 which passes through an opening in the jack rocking arm 422 and is secured in the upper end of an arm 428 of an actuating lever 430 pivoted on a forwardly and rearwardly extending spindle 432 in the jack rocking arm 422. The bolt 420 is urged in a direction to enter the hole 418 in the arm 198 by a compression spring 434 housed within the arm 422 and engaging the inner end of the bolt 420. The bolt actuating lever 430 has a laterally extending arm 436 which is normally held against an adjustable screw 438 in the jack rocking arm 422 by the spring 434. Pivoted to the outer end of the laterally extending arm 436 is an upwardly extending bar 440 which passes through an opening in the outer end portion of a trip arm 442. This trip arm is pivoted on a forwardly and rearwardly extending pin 444 carried by an upwardly projecting bracket of the arm 422 above the bolt 420. A tension spring 446 connects a downwardly extending arm 448 of the trip arm 442 to the upwardly extending bar 440 urging the arm 448 toward a stop pin 450 in the jack rocking arm and the side face of the bar 440 toward a roll 452 on the jack rocking arm 422. Secured to the underside of the trip arm 442 is a block 454 arranged to engage the upper end of a block 456 on the side of the bar 440 during the operation of the machine on a shoe.

Upon forward movement of the jack at the conclusion of a leveling operation toward its loading position the rearwardly extending arm 198 and the jack rocking arm 422 are moving upwardly whereupon the trip arm 442 moves into engagement with a screw 458 carried by a bracket 460 in the upper portion of the machine frame so that the trip arm moves downwardly about its pivot 444. During this movement the block 454 engages the upper end of the block 456 on the bar 440 moving the bar downwardly and rocking the bolt actuating lever 430 in a clockwise direction to withdraw the bolt 420 from the rearwardly extending arm 198 of the jack post. As soon as the bolt is withdrawn from the jack post the jack moves forwardly by gravity to its forwardmost position until the leather-covered lug 284 (Fig. 3) engages the lug 286 on the machine frame. The arm 422 continues to move upwardly and the bar 440 moves further downwardly whereupon a cam 462 on the side of the bar 440 engages the roll 452 moving the bar about its pivot against the action of the spring 446 to move the block 456 on the bar from beneath the block 454 on the trip arm 442. The spring 434 thereupon pushes the bolt 420 outwardly and the bar 440 upwardly into the position shown in Fig. 5. Upon downward movement of the jack rocking arm 422 at the beginning of the next cycle of operations of the machine the outer end of the trip arm 442 is raised by the spring 446 and the block 456 on the bar 440 snaps under the block 454 on the trip arm 442.

The rearwardly extending arm 198 has an inclined cam face 439 (Fig. 5) which engages the outer end of the bolt 420 and pushes the bolt inwardly against the action of the spring 434 upon rearward movement of the jack rearwardly from its forwardmost position. This action continues until the hole 418 in the arm 198 arrives opposite to the bolt whereupon the bolt snaps into the hole thus connecting the jack to the power operating mechanism. Carried in the rear end of the arm 198 is a vertically movable plunger 441 the lower end of which engages a lug 443 on the jack rocking arm 422 during this rearward movement of the jack, causing upward movement of the plunger and stressing of a leaf spring 445 secured to the arm 198. This spring provides a force to start movement of the jack forwardly at the end of the leveling operation upon withdrawal of the bolt 420 in the jack actuating arm from the hole 418 in the jack.

Should it be desired to arrest the forward motion of the jack in the position shown in Fig. 2, the bracket 460, which is pivoted to a bracket 461 (Fig. 6) is swung out of the way so that the trip arm 442 is not operated to withdraw the bolt 420 to release the jack for forward movement beyond the position shown in Fig. 2. With the bracket 460 swung about its pivotal connection to the bracket 461 (Fig. 6) a spring pressed plunger 464 carried by the bracket 461 engages a flat surface 466 on the bracket 460 to hold this latter bracket and the screw 458 in inoperative position. Thus the bolt 420 remains in engagement with the jack rocking arm at all times.

For rocking the jacks in the leveling operation each jack rocking arm 422 has a forwardly and rearwardly extending arcuate slot 468 in which is adjustably mounted a block 470 pivotally connected to the upper end portion of one of a pair of actuating links 472 there being one link for each jack. The lower ends of the links 472 are pivoted to a jack operating lever 474. The forward end of this lever is pivoted to the upper end of a connecting rod or crank 476 the lower end of which surrounds an eccentric 478 carried by a shaft 480 journaled in bearings in the housing 120 (Fig. 2) and in a bracket 482 (Fig. 1). The shaft 480 has secured to it a worm gear 484 (Fig. 2) driven by a worm 486 on the driveshaft 10, and consequently rotates continuously during each cycle of operation of the machine. The rear end of the jack actuating lever 474 is pivoted to the front end portion of a guiding link 488 which extends rearwardly and downwardly and is pivoted at its rear end to a bracket 490 on the machine frame. The jack actuating lever 474 carries a cam roll 492 which rides in a cam groove 494 in a cam 496 carried by the cam shaft 130. This shaft carries a gear 498 driven from a gear 500 carried by the shaft 480. The arrangement is such that the cam shaft 130 rotates once for every three turns of the shaft 480.

The forward and rearward movements of the jack are controlled by the vertical movements of the link 472 which is in turn controlled by the conjoint action of the eccentric 478 and the cam roll 492 riding in the groove 494 of the cam 496. The arcuate slot 468 of the jack rocking arm 422 is concentric with the lower pivot of the link 472 at the time when the jack has been moved rearwardly a slight amount from the position shown in Fig. 2 and the leveling roll 270 has been moved downwardly into engagement with the toe portion of the shoe on the jack. Thus it will be apparent that adjustment of the block 470 along the slot 468 will not vary the position, along the shoe, of the point of engagement of the roll with the shoe, but will vary the extent of rearward movement of the jack with the shoe in the leveling operation. Provision is therefore made for adjusting the block 470 along the slot 468 automatically upon adjustment of the heel post toward or away from the toe post so that the extent of movement of the jack will vary according to the size of the shoe being operated upon. For this purpose the heel post 202 is provided with a downwardly extending arm 502 (Fig. 4) the lower end of which is connected by a link 504 to the lower end of a lever 506 pivoted on a bracket 508 secured to the jack post 188. The upper end of the lever 506 is connected to the forward end of an adjusting link 510 which extends rearwardly below the shaft 196 and then upwardly terminating in a fork 512. Rotatably mounted in the fork 512 is a screw 514 having a relatively coarse thread and held by collars from axial movement in the fork. The screw is threaded through a block 516 in the fork and pivoted to the upper end of the actuating link 472 to which the aforementioned block 470 is pivoted. Upon adjustment of the heel post toward or away from the jack posts the adjusting link 510 is moved lengthwise causing movement of the block 516 in the arcuate slot toward or away from the pivot of the jack actuating arm 422 so that the forward and rearward movements of the jack are automatically adjusted in accordance with the size of the shoe during adjustment of the heel post toward or away from the toe post.

Provision is made for adjusting the block 470 along the arcuate slot independently of adjustments of the heel post in order to cause the jack to travel a greater or less distance than that provided by the adjustment of the heel post. For this purpose provision is made for rotating the screw 514 by means of a hand wheel 518 which is secured to the upper end of a sleeve 520 in which is keyed a slidable rod 522 connected by a universal coupling 524 with the screw 514. The front end of the sleeve 520 is rotatable in a swivel block 521. The pivotal and sliding connections between the screw 514 and the swivel block 521 permit adjustments of the block 470 independently of the hand wheel 518 upon movement of the heel post toward or away from the toe post.

An indicator 526 is provided to assist the operator in making the desired adjustment by the wheel 518. This indicator comprises a pointer 528 movable over suitable indicia on a block 530 on which the pointer is pivoted. The pointer has a tooth which is received between a pair of flanges 532 on the sleeve 520 so that if the sleeve is moved axially during turning of the wheel 518 the pointer 528 will move over the indicia on the block 530. The upper end of the sleeve has a screw-threaded portion 534 having a relatively fine thread threaded through the block 521. Because of the relatively coarse threads on the screw 514 compared with the relatively fine threads 534 a relatively small axial movement of the sleeve 520 will produce a much greater movement of the blocks 470, 516.

The machine has a pair of leveling rolls 270, one associated with each jack. The following description refers to the leveling roll associated with the right hand jack, it being understood that the mountings and actuating mechanisms for the two rolls are similar.

The roll 270 (Fig. 6) is mounted for rotation on a pin 536 carried at the forward end of a holder 538 pivoted at 540 on a carrier 542 mounted for turning movement about a shaft 544 extending forwardly and rearwardly in the head of the machine. Thus the roll is movable vertically about the pin 540 and is arranged for tipping movements about the axis of the shaft 544. Extending laterally and to the right from the carrier 542 is an arm 546 to which is pivoted the upper end of a vertically extending link 548 the lower end of which is connected to mechanism to be described for moving the carrier 542 about the axis of the shaft 544 to effect the tipping movements of the roll 270 during the leveling operation. The leveling rolls associated with each jack are interconnected for simultaneous tipping movements in opposite directions. For this purpose each carrier 542 has extending laterally from it and toward the left an arm 550 (Fig. 1) to which is pivoted a vertically extending link 552, the lower ends of the links being connected to the opposite ends of a lever 554 pivoted midway of its length on a pin 556 carried by a bracket 558 in the head of the machine. Thus tipping movements imparted to the right hand leveling roll 270 will be transmitted to the left hand roll 270 but in opposite directions.

Figure 6:
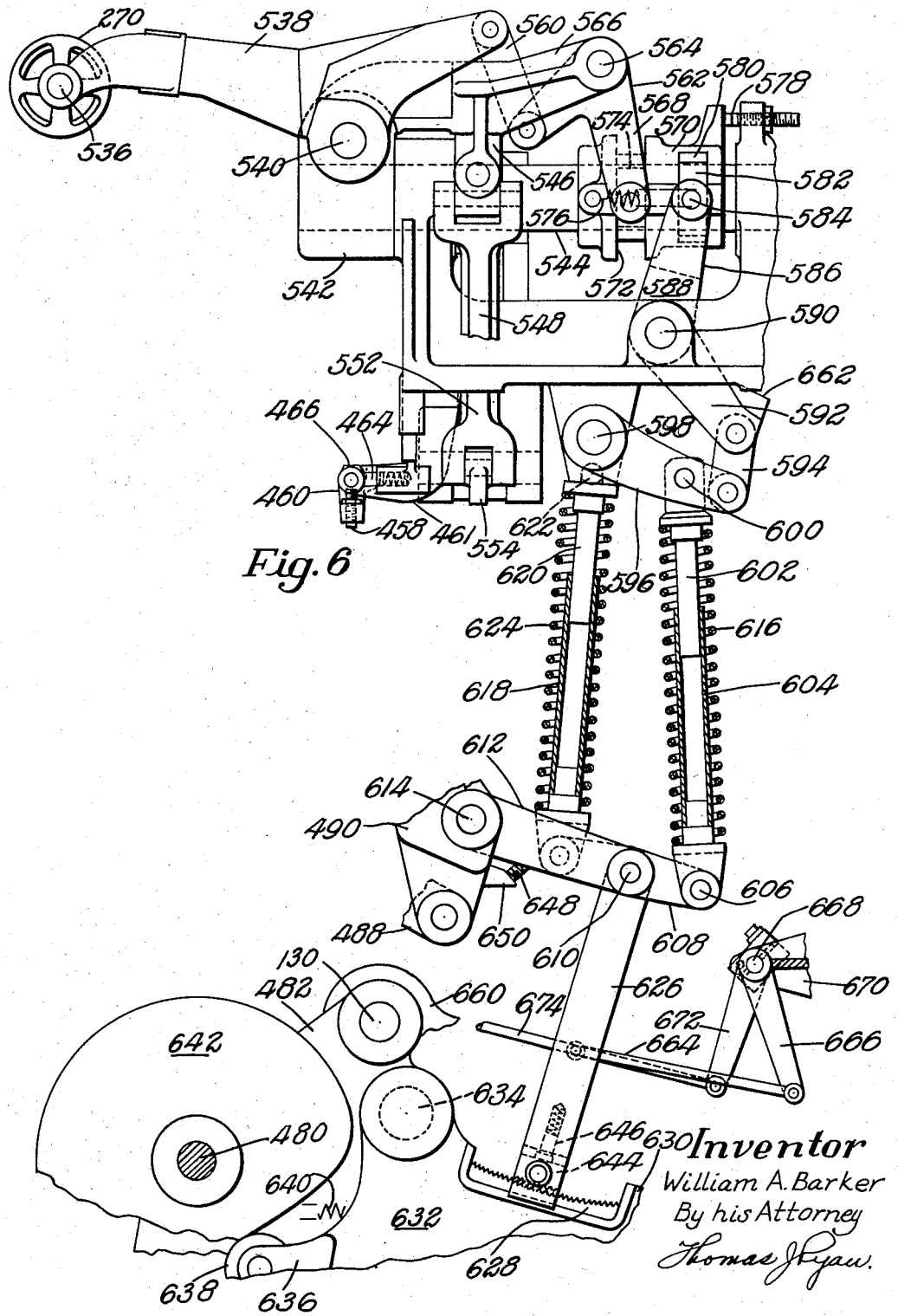
Fig. 6 is a side elevation of one of the leveling roll supporting and actuating mechanisms.

The holder 538 for the leveling roll has a rearwardly extending arm connected by a link 560 (Fig. 6) to one arm of a bell crank lever 562 pivoted at 564 in a rearwardly extending arm 566 of the carrier 542. The bell crank lever 562 includes a downwardly extending arm 568 the lower end of which is forked to surround a sleeve 570 carried by the shaft 544 and slidable thereon. The sleeve 570 has an annular groove 572 to receive blocks 574 pivotally carried by the forks of the arm 568 of the bell crank lever. Movement of the sleeve 570 operates to move the holder 538 about the axis of the pin 540 thus imparting movements of the leveling roll toward and away from the shoe on the jack, the arrangement being such that movement of the sleeve 570 to the left as shown in Fig. 6 or forwardly of the machine moves the leveling roll 270 down. The sleeve 570 is held by a pair of tension springs 576, with the machine at rest, against an adjustable stop screw 578 with the leveling roll in elevated position.

Figure 7:
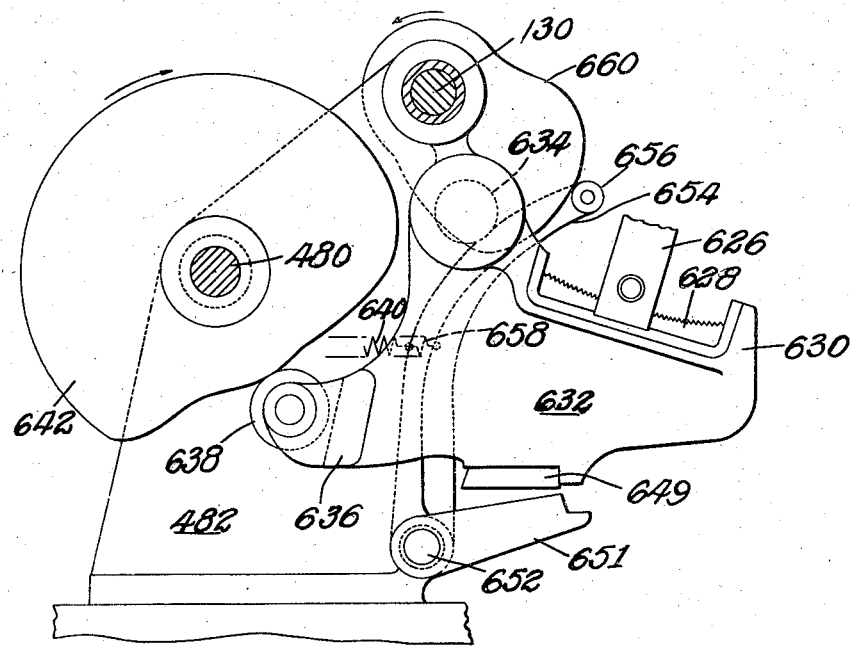
Fig. 7 is a detail of a portion of the mechanism of Fig. 6 and illustrating a portion of the mechanism which is broken away in Fig. 6.

For moving the sleeve 570 forwardly to depress the leveling roll, mechanism shown in Figs. 6 and 7 is provided. The sleeve 570 has formed on the sides thereof recesses 580 in which are located blocks 582 pivoted at 584 on upwardly extending spaced arms 586 of a lever 588 pivoted at 590 in the head of the machine. The lever 588 has a downwardly and rearwardly extending arm 592 connected by a link 594 to an arm 596 pivoted at 598 in a bracket extending downwardly from the head of the machine.

Pivotally connected to the arm 596 at 600 is the head of a rod 602 which is slidingly mounted in a sleeve 604 pivoted at 606 to a rocker member 608 which is pivoted midway of its front and rear ends on a shaft 610 carried in the rear end of a guiding member 612, the front end of which is pivoted at 614 to the bracket 490. A compression spring 616 extends between the heads on the rod 602 and on the sleeve 604. The front end of the rocker member 608 has pivoted to it a head carrying a sleeve 618 extending upwardly and slidingly receiving a rod 620 having a head on its upper end carrying a ball 622. This ball is seated in a recess in the lower side of the bracket carrying the pivot 598. Surrounding the sleeve 618 and the rod 620 is a compression spring 624. Associated with each jack is a pair of springs and a rocker member 608 but the guiding member 612 is common to the two sides of the machine as shown in Fig. 19. Connected to the pivot 610 between the rocker members 608 and the guiding member 612 is the upper end portion of a thrust member 626 the lower end of which is forked and straddles a block 628 carried by a rearwardly extending arm 630 of a pressure cam lever 632. This lever is pivoted on a shaft 634 carried by the bracket 482 in which is mounted the cam shaft 130 and the eccentric carrying shaft 480. The pressure cam lever 632 has a forwardly extending arm 636 carrying a cam roll 638 held by a spring 640 against a cam 642 carried by the shaft 480. The upper face of the block 628 is concentric with the pivot 610 with the machine in loading position. Carried by the forked lower end of the thrust member 626 is pivoted a block 644 having on its lower face teeth arranged to engage teeth on the upper face of the block 628 for locking the parts together when the pressure cam lever 632 is turned slightly in a counterclockwise direction from the position shown. The block 644 is normally held in a central position about its pivot by a spring plunger 646 engaging the upper face of the block 644. With the jacks in loading position, the block 644 is spaced from the block 628 to permit adjustment of the thrust member 626 about the pivot 610, the thrust member being held with the block 644 spaced from the block 628 by an adjustable stop screw 648 carried by the guiding member 612 and engaging a lug 650 on the bracket 490.

Adjustment of the thrust member 626 about the pivot 610 varies the position of its lower end with respect to the pivot of the cam lever 632 to vary the distance the thrust member 626 is moved by the cam lever, thereby to vary the extent of the compression of the springs 616, 624 after the leveling roll has engaged the shoe bottom thereby to control the pressure of the roll against the shoe. At the beginning of the cycle of operations of the machine the pressure cam lever 632 is operated by the cam 642 to move the block 628 into locking engagement with the block 644 on the thrust member 626 and then to move the thrust member vertically whereupon the leveling roll moves into engagement with the toe end of the shoe and presses the roll through the compression springs 616, 624 against the shoe bottom. These compression springs are compressed equally and are equivalent to a single spring equal to the combined length of the two springs thus insuring that the leveling roll pressure will not vary appreciably as the leveling roll follows the contour of the shoe bottom.

As heretofore explained, the shaft 480 turns three times in each cycle of operations of the machine and it is necessary that the leveling roll pressure be maintained during the entire cycle. Accordingly provision is made for holding the cam lever 632 in the position to which it is moved by the cam 642 at the beginning of the machine cycle to force the roll into engagement with the shoe bottom. For this purpose the pressure cam lever 632 is provided on its underside with a block 649 (Fig. 7) the front end of which is arranged to be engaged by the rear end of a latch 651 carried by a shaft 652 journaled in the bracket 482. Also secured to the shaft 652 is an upwardly extending arm 654 carrying at its upper end a cam roll 656 held by a spring 658 against a cam 660 on the shaft 130, which turns only once during each cycle of operations of the machine. As soon as the leveling roll has been forced against the shoe bottom by movement of the pressure cam lever 632 about the pivot 634 the latch moves upwardly in front of the block 648 to hold the pressure cam lever in the position to which it is moved and holds the pressure cam lever in this position until the latch is moved out of engagement with the block by the cam 660 at the conclusion of the cycle of operations of the machine. It will be understood that the two leveling rolls will be moved downwardly simultaneously even through the jack associated with one of the rolls may be in its forward inoperative position. However, downward movement of the associated leveling roll is limited by engagement of a face 662 (Fig. 6) on the arm 592 of the lever 588 with a face on the head of the machine.

For adjusting the thrust member 626 with respect to the pressure cam lever for varying the pressure of the leveling rolls against the shoe bottom, the thrust member has pivoted to it a link 664 which is pivoted at its rear end to the lower end of an arm 666 the upper end of which is secured to a shaft 668 carried by a bracket 670 inside the rear of the frame of the machine. Also secured to the shaft 668 is a downwardly extending arm 672 to which is pivoted a rod 674 which extends forwardly to the front of the machine and is connected to a hand lever 676 (Figs. 1 and 2). A suitable friction device (not shown) on the shaft 668 is provided for holding the shaft and the thrust member in adjusted positions until the thrust member is locked to the pressure cam lever 632. Thus through the connections above described the lever 676 acts as a convenient adjusting member by which the operator may predetermine the effectiveness of the springs 616 and 624 in pressing the roll against the shoe bottom. Since the thrust member 626 is locked to the arm 630 during the operation of the machine, as previously described, the lever 676 is operable only when the machine is at rest.

The link 548 by which tipping movements are imparted to the carrier 542 and the leveling roll 270 extends downwardly and is connected by a universal coupling 678 (Fig. 8) to an arm 680 of a bell crank lever 682 pivoted on a shaft 684 at the rear of the frame of the machine. A downwardly extending arm 686 of the bell crank lever is connected to a member 690 secured to the rearward end of a shaft 692 rotatably and slidably mounted in the right hand side member of the frame of the machine near the rear thereof. This shaft carries a sprocket 694 connected by a sprocket chain 696 to a sprocket 698 (Fig. 1) carried by a countershaft 700 which is in turn connected by a sprocket chain 702 to the sprocket 38 on the drive shaft 10. The connection between the sprocket 694 and the shaft 692 comprises a hub 704 on the shaft 692 (Figs. 8 and 9) to which the sprocket 694 is secured. The hub 704 is held against endwise movement by fixed bearings 706, 708 to support the shaft 692 for rotation and sliding movement. A block 710 secured to shaft 692 has secured in it two pins 712, 714 carrying rolls 716, 718. These rolls are engaged by faces 720, 722 on the hub 704. Accordingly, the hub rotates the shaft 692 through the rolls, pins and block, and the rolls move along the faces 720, 722 upon lengthwise movement of the shaft in a manner to be described.

The shaft 692 has secured to it a pair of worms 724, 726 having left and right hand threads respectively. Meshing with these worms are worm gears 728, 730 journaled on shafts 732, 734. If one of the worm gears is locked to its supporting shaft, then upon rotation of the shaft 692 axial movement will be imparted to it by that worm meshing with the worm gear which is locked against rotation, the direction of such axial movement of the shaft 692 depending upon which of the worm gears is held against rotation.

Secured to the worm gears 728, 730 are drums 736, 738 having knurled surfaces as shown in Fig. 21. Surrounding each of the drums is a brake band 740, 742 each of the bands being in the form of a torsion spring of rectangular cross section, the springs associated with the two drums being wound in opposite directions. Upon tightening one of the bands about its drum, turning of the associated worm wheel is stopped to cause axial movement of the shaft 692 and consequently tilting of the leveling rolls in one direction or the other. As viewed in Fig. 8 if the drum 736 is locked against rotation the shaft 692 moves to the left and moves in the opposite direction upon locking the drum 738 against rotation.

Formed in the right hand end coil of each of the brake bands is a recess 744 engaged by a block 746 carried by an arm 748 pivoted on an eccentric portion of a stud 750 journaled in the side frame member of the machine. Springs 752 move the arms 748 upwardly so that the blocks 746 are engaged with the recesses 744. By rotating the shafts 750, the positions of the arms and consequently the positions of the ends of the brake bands may be adjusted with respect to the drums. The other end of each brake band has a recess 754 engaged by a block 756 carried at the end of a thrust rod 758 the other ends of the thrust rods having ball and socket connections with the lower end of a brake lever 760. Springs 762 act on the blocks 756 to maintain them in the recesses 754 in the brake bands. It will be apparent that upon rocking the brake lever 760 one of the brake bands will be tightened about the periphery of the associated drum so as to cause movement of the shaft 692 in one direction or the other depending upon the direction of movement of the brake lever.

The brake lever 760 is carried by a shaft 764 and its upper end has pivoted to it at 766 a brake controlling lever 768 which extends downwardly parallel to the brake lever 760. The lever 768 carries at its end a roll 770 which is engaged by flanges 772, 774 carried by the worms 724, 726. The brake controlling lever 768 extends upwardly above the pivot 766 and has connected to its upper end one end of a tension spring 776 the other end of which is connected to the frame of the machine. The spring 776 tends to move the lower end of the brake controlling lever 768 toward the left as viewed in Fig. 8 and when permitted, as will hereinafter appear, causes the front brake band 740 to grip its drum 736.

Pivoted at 778 to the upper end portion of the brake controlling lever 768 is the front end portion of a rearwardly extending actuating link 780 to the rear end of which is pivoted at 782 a block 784 slidable along an arcuate face 786 formed on the front of a curved lever 788 pivoted at 790 to the frame of the machine. The actuating link 780 is connected by an adjustable link 792 to an arm 794 secured to a shaft 796 so that upon rotation of the shaft the actuating link 780 is moved about its pivot 778 with the block 784 in sliding engagement with the arcuate face 786 of the lever 788.

For operating the shaft 796 there is secured to it an arm 798 to which is pivoted at 800 a cam arm 802 which is normally held against a stop 804 on the arm 798 by a latch 806 pivoted at 808 to the arm 798. Carried by the cam arm 802 is a cam roll 810 which engages a cam groove 812 in the aforementioned cam 126. As long as the latch 806 holds the cam arm 802 against the stop 804 the arm 798 and the cam arm 802 will move as a unit about the axis of the shaft 796 until the latch 806 is released from the cam arm 802.

With the machine at rest the leveling rolls are horizontally disposed and the axis of the pivot 782 which connects the block 784 to the actuating link 780 is in alinement with the axis of the pivot 790 of the curved lever 788 and the arcuate face 786 of the curved lever is concentric to the pivot 778 connecting the link 780 to the brake controlling lever 768. With the parts thus positioned the actuating link 780 can be moved up or down by the mechanism just described without imparting any movement to the brake controlling lever 768 so that no tipping movements will be imparted to the leveling rolls. However, during the leveling operation the curved lever 788 is moved about its pivot 790 by mechanism to be described in accordance with the desired tipping movements to be imparted to the rolls. Upon movement of the curved lever 788 in one direction or the other about its pivot 790, upward movement of the block 784 against the arcuate face 786 of this lever will cause lengthwise movement of the actuating link 780 and movement of the brake controlling lever 768 about its pivot 766 to the brake lever 760. Such movement of the brake controlling lever 768, inasmuch as the roll 770 is confined between the flanges 772, 774 of the worms 724, 726, will cause the brake lever 760 to move about its pivot 764 to cause one of the brake bands to grip the associated drum and stop rotation of the associated worm gear thereby to impart lengthwise movement to the shaft 692 causing tipping of the rolls in one direction or the other. This tipping movement continues until movement of the actuating link 780 stops whereupon the brake actuating lever 768 by its connection to the upper end of the brake lever 760 and its connection to the shaft 692 by the roll 770 confined between the flanges 772, 774 moves the brake lever 760 back to mid position as shown in Fig. 8, thus freeing the brake band which has heretofore been gripping the associated drum, whereupon the tipping movement of the leveling rolls ceases. Thus there is provided a follow-up mechanism such that the direction and extent of tipping movements of the leveling rolls are governed by the direction and extent of movement of the brake controlling lever 768.

The worm gears 728, 730 run in an oil bath provided by a chamber formed in the frame of the machine, the oil lubricating the worms, worm gears and brake bands. Inasmuch as the surface of each of the drums 736, 738 is knurled, free flow of oil between the brake bands and the drums is facilitated when the brake bands are released without impairing the prompt gripping action between the brake bands and the drums when the bands are tightened about the drums. Each of the drums is provided with a series of grooves 814 extending axially in the outer surface thereof through which the oil may flow.

For moving the curved lever 788 about its pivot 790 to control the lengthwise movement of the link 780 during its up and down movements, the upper end of the lever 788 is connected by a universal coupling and a connecting link 816 to an arm 818 secured to the lower end of a vertical shaft 820. Also secured to this shaft at its upper end is an arm 822 (Figs. 8 and 10) which extends forwardly and on its right hand side adjacent to its front end is provided with a vertical face 824. Journaled on a second vertical shaft 826 in front of the shaft 820 is a rearwardly extending arm 828 provided at its rear end with a vertical face 830 opposite to the face 824 of the arm 822. Between the faces 824, 830 and separating them a predetermined amount is a stud 832 (Fig. 11) secured at the rear end portion of a horizontally extending link 834 supported on the arms 822, 828. A spring 835 holds the arms 822, 828 with their faces 824, 830 in contact with the stud 832. The link 834 is pivoted at its forward end to an arm 836 of a bell crank lever 838 pivoted at 840 to the frame of the machine. The bell crank lever 838 includes a forwardly extending arm 842 having at its forward end a vertical plunger 844 carrying at its upper end a knob 846 by which the plunger may be pulled upwardly out of one of a series of holes 848 in a plate 849 secured to the machine. It will be noted that the surfaces 824, 830 on the arms 822, 828 are inclined with respect to each other so that upon movement of the stud 832 lengthwise of the arms by adjustment of the bell crank lever 838 the position of the arm 822 with respect to the arm 828 is varied.

Carried by the rearward end of the arm 828 is a template roll 850 engageable with the edge face of a template 852 which consists of a plate-like cam detachably secured to the upper end of a vertical shaft 854. For correctly locating the template with respect to the shaft it is provided with a pair of holes to receive pins 856 carried by a flange 858 (Fig. 8) secured to the upper end of the shaft. The template is easily replaced by another simply by lifting it off the pins and placing another template of the desired size and shape on the pins.

The shaft 854 is arranged to be oscillated during the leveling operation to move the curved lever 788 (Fig. 8) about its pivot 790 according to a predetermined schedule. For this purpose the lower end of the shaft 854 carries a bevel gear 860 which meshes with a gear segment 862 secured to a shaft 864 to which is also secured a downwardly extending arm 866. This arm is connected by an adjustable link 868 to a cam lever 870 which is pivoted at 872 in the frame of the machine. The cam lever 870 carries at its lower end a cam roll 874 received by a cam track in the left side of the cam 126. During each cycle of operations of the machine, the template 852 (Fig. 10) is moved from a starting or mid position first in a clockwise direction through approximately 160° then back to the position illustrated, and in a counterclockwise direction therefrom through about a 160°, then back to the position illustrated and again in a clockwise direction about 160° and finally back to its mid position. During these movements of the template 852 the connecting link 816 is moved lengthwise to swing the curved lever 788 in one direction or the other, the direction and extent of movement depending upon the shape of the template 852. In addition, during each cycle of operations of the machine the block 784 on the actuating link 780 is moved from the starting position in which its pivot is in alinement with the pivot 790 of the curved lever 788 upwardly in three steps and back to its original position in one step.

The lengthwise movement of the actuating link 780 to cause lengthwise movement of the shaft 692 as heretofore explained and consequent tipping of the leveling rolls may be controlled by the template 852 or by movements of the block 784 along the arcuate surface 786 of the curved lever 788 or by a combination of both. On the one hand, if the axis of the block 784 on the actuating link 780 has been moved by the cam 126 out of alinement with the axis 790 of the lever 788 and the curved lever 788 is moved by the template, the actuating link 780 will be moved lengthwise to cause tipping of the leveling rolls. On the other hand if the template has moved the lever 788 to a position in which its arcuate face 786 is not concentric to the pivot 778 of the actuating link, movement of the actuating link by the cam 126 will cause the block to move along the curved face of the lever 788 to move the actuating link lengthwise and cause tipping of the leveling rolls. Simultaneous movement of the template and cam 126 may cause the actuating link 780 to be moved lengthwise and the rolls tipped. Consequently the template controls the tipping of the rolls both as regards the extent and the time in the machine cycle when the tipping movements occur.

By varying the position of the stud 832 (Fig. 10) the extent of movement of the curved lever 788 by the template is varied thus providing an additional control over the tipping movements without the necessity of changing templates as may be desirable in operating on shoes of a given style but different sizes. It will be understood, of course, that substitution of one template for another may be rapidly and easily made to vary the time and extent of tipping movements of the leveling rolls. It will further be understood that the same template is used for a right and a left shoe since the rolls in the two stations of the machine are tipped at the same time but in opposite directions. Each template has parts of its periphery shaped to correspond with the heightwise contours along the side margins of the shoe, there being a point between those parts on the periphery corresponding to the toe end of the shoe.

Mechanism is provided for automatically lubricating various moving parts of the machine. This mechanism comprises a box 876 (Figs. 2, 14 and 15) secured in a recess to the right side of the machine frame. Within the upper portion of the box 876 is an oil reservoir 878 covered by a lid 880 which carries a gage stick 882 for measuring the amount of oil within the reservoir 878.

Extending through the box below the reservoir 878 is a bore 884 within which is journaled a shaft 886. A series of ports 888 connect the reservoir 878 with the bore 884 and the shaft 886 has a plurality of recesses 890 which communicate with the ports 888 when the shaft 886 is in the position illustrated in Figs. 14 and 15. Upon rotation of the shaft 886 through 180° the recesses 890 lie opposite ports 892 which provide communication between the bore 884 and short tubes 894 whereupon the oil received in the recesses 890 when the shaft 886 is in the position illustrated in Figs. 14 and 15 is transferred to the short tubes 894 upon rotation of the shaft 886 through a predetermined angle. The lower ends of the tubes 894 are directly above pipes 896 which lead to various parts of the machine. The ports 892 may communicate with the atmosphere by way of small vent holes (not shown) to prevent air becoming locked within the ports causing interruption of oil flow.

Provision is made for turning the shaft 886 through a small predetermined angle during each cycle of operations of the machine so that after a predetermined number of cycles of operations, oil will be transferred through the pipes 896 to those portions of the machine which are to receive oil, the amount of oil depending upon the depths or sizes of the recesses 890 in the shaft 886 which determine the amount of oil which can be carried by the recesses to the ports 892 whence the oil is fed by gravity to the various parts of the machine. For thus rotating the shaft 886, it carries at its forward end a ratchet 898 with which cooperates a pawl 900 pivoted on the lower end of an arm 902 the upper end of which is secured to a shaft 904 rotatable in the lid 880. Also carried by the shaft 904 is an actuating arm 906 connected by a link 908 to the cam arm 802 (Fig. 8), the lower end of the link having a bent portion which extends through a large hole 910 in the cam arm to provide a lost motion connection. As heretofore explained, the cam arm 802 is oscillated during each cycle of operations of the machine and hence imparts vertical movement to the link 908 and through the connections heretofore described will impart step-by-step movement to the shaft 886 of the lubricating mechanism. The link 908 is adjustable as to length thereby to vary the effect of the lost motion connection with the cam arm 802 and therefore to vary the extent of turning movement of the shaft 886 during each cycle of operations of the machine. Thus the number of cycles of operation through which the machine goes between each lubrication thereof may be varied.

A spring plunger 912 acts on a depending arm 914 of the actuating arm 906 to return the pawl 900 to a predetermined position according to the position of a stop screw 916, between succesive turning movements imparted to the shaft 886. To prevent unintentional movement of the shaft 886 during this retrograde movement of the pawl 900, a spring 918 acting between a plate 920 closing the side of box and the shaft 886 operates to move the shaft toward the right as viewed in Fig. 14 to hold the side face of the ratchet 898 in frictional engagement with the adjacent portion of the bearing for the shaft 886. The right side of the box is provided with a glass cover 922 so that an operator may observe whether oil is being supplied to the machine.

In the operation of the machine it will be assumed that a right shoe is to be operated upon and this shoe will therefore be placed on the right hand jack as heretofore described when the jack is in its forwardmost position. It will be understood of course that two shoes may be operated upon simultaneously if desired, in which event the two jacks will move in unison and the leveling rolls will move together but in opposite directions. With the shoe on the right hand jack, the jack is swung rearwardly by the operator until it is connected by the pin 420 (Fig. 5) with the jack rocking arm 422 at which time the toe end of the shoe will be located slightly forward of the leveling roll as shown in Fig. 2. That point on the periphery of the template 852 (Fig. 10) representing the toe end of the shoe will lie in engagement with the template roll 850. During initial rearward movement of the jack by the power operated mechanism, the template 852 starts to turn in a clockwise direction as viewed in Fig. 10. Simultaneously therewith the leveling roll 270 is moved downwardly and moves into engagement with the sole of the shoe at A (Fig. 16) just heelwardly of the toe end of the sole. The jack then continues to move rearwardly and the central portion of the leveling roll engages the central portion of the sole along the forepart while the roll is horizontally disposed. It is to be understood that the work engaging surface of the leveling roll is usually curved widthwise of the sole and that the radius of the curve is usually greater than the radius of curvature of various portions of the sole widthwise thereof so that the work is usually engaged by the mid portion of the roll. As the ball line of the shoe passes beneath the leveling roll the roll is tipped slightly toward the inside of the shoe at B, this tipping being effected by the combined action of the cam 126 moving the block 784 (Fig. 8) upwardly and the template 852 having moved the curved lever 788 forwardly about its pivot, that portion of the template being indicated by the arrow B' (Fig. 10) being in engagement with the roll 850. The roll remains tipped in this manner while the shank portion is passing beneath the roll and is being leveled.

Figure 16:
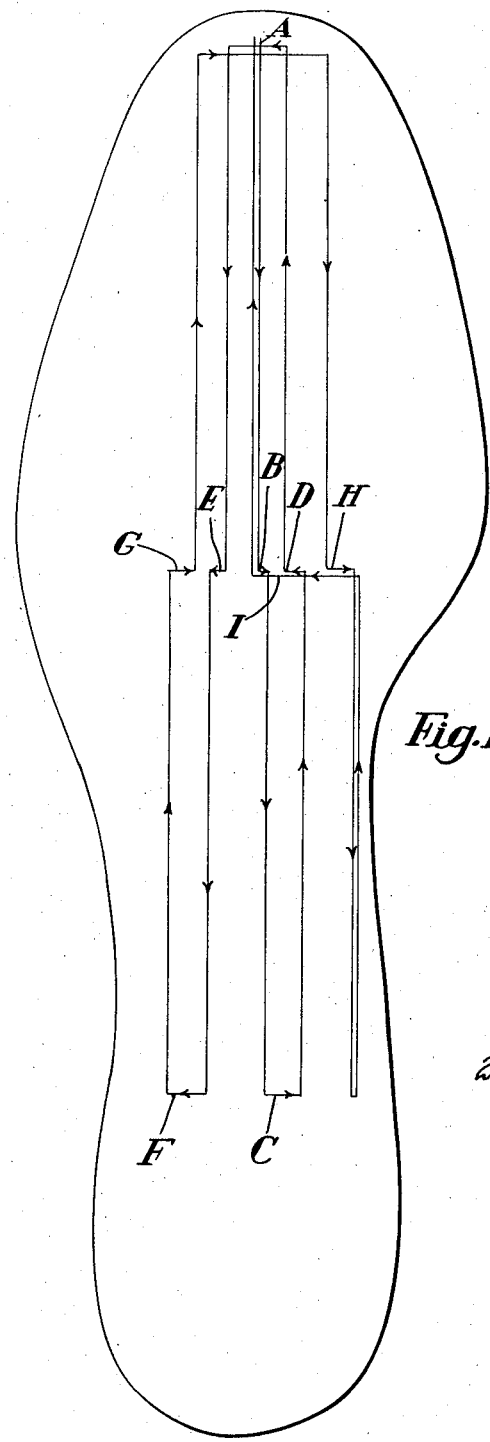
Fig. 16 is a diagram showing the bottom of an inverted shoe and the path of the leveling roll thereon.

When the heel breast line or the portion of the sole just beyond it arrives beneath the leveling roll the roll is tipped further in the same direction at C in Fig. 16, this further tipping movement being effected by the further upward movement of the block 784 (Fig. 8) along the curved lever 788 the lever having already been moved by the template 852 further forwardly during this tipping of the leveling roll, the portion of the template indicated by the arrow C' being in engagement with the roll 850. The jack now moves forwardly and the roll remains so tipped as it traverses the shank portion of the shoe until the ball line approaches the leveling roll at which time the roll is tipped somewhat in the opposite direction at D, this tipping being effected by the combined action of the block 784 being moved downwardly and the portion B' of the template being in engagement with the roll 850. As the jack continues to move forwardly the forward part of the sole between its central portion and inner edge is leveled.

As the toe end of the sole arrives beneath the leveling roll the roll is tipped at A (Fig. 16) by the template 852 moving the curved lever 788 rearwardly until the roll is inclined the same amount in the opposite direction from which it had been, the portion of the template at A' being in engagement with the roll 850. The jack now starts moving rearwardly, the roll leveling the forepart of the sole between the middle and outside edge thereof. As the ball line approaches the leveling roll the template 852 causes the curved lever 788 to swing rearwardly and the block 784 is moved upwardly, the leveling roll being tipped at E (Fig. 16) somewhat further in the same direction, and with the roll thus tipped the shank portion between the center and outside edge of the shoe is leveled. At this time the portion E' of the template is in engagement with the roll 850. As the heel breast line arrives beneath the leveling roll the block 784 is raised along the curved lever 788 causing the roll to be tipped further at F and upon forward movement of the jack the outer edge portion of the sole along the shank is leveled. During this tipping of the roll at F the portion F' of the template is in engagement with the roll 850.

As the ball line approaches the leveling roll the template moves the curved lever 788 forwardly causing the roll to tip at G toward a more horizontal position and the roll remains in this position while the outer edge of the forepart of the sole is leveled. During the tipping at G, the portion E' of the template is in engagement with the roll 850. When the toe end of the sole again arrives beneath the leveling roll the template moves the curved lever further forwardly to cause the roll to tip over in the opposite direction and to remain in this position while the inside edge portion of the forepart is leveled. When the ball line of the sole again arrives beneath the leveling roll the template moves the curved lever still further forwardly to tip the roll at H about the same angle as when the outer edge portion of the shank was being leveled and the inside margin of the shank is now leveled. During this tipping at H, the portion C' of the template engages the roll 850. The roll now remains in this position until the jack completes its rearward movement and then moves forwardly carrying the ball line of the shoe beneath the leveling roll again whereupon the leveling roll begins to return to its horizontal position at I while the central portion of the forepart is leveled until when the inseam at the toe end arrives beneath the roll the roll is raised from the work.

The movement of the leveling roll to its horizontal position at I is effected by the template moving the curved lever 788 back to its starting position. At the same time the latch 806 is released from the cam arm 802 by engagement of a block 924 (Fig. 8) on the cam 126 with the latch 806 allowing a spring 926 connected to an extension 928 of the arm 798 quickly to return the block 784 to its lowest position in which the axes of the pivots 782, 790 are in alinement, the arm 928 being held against a stop screw 930. With the leveling roll operating along the inside shank portion of the sole the roll is fully tipped and at the ball line it is desirable rapidly to return the leveling roll to its horizontal position.

The arrangement whereby the latch 806 is released provides for this quick movement of the roll and allows the roll to return more rapidly than can be conveniently achieved by a suitably shaped cam groove 812. When the cam arm 802 is later moved downwardly by the cam groove 812 the latch 806 snaps over the end of the arm 802. As the jack continues its forward movement the pin 420 (Fig. 5) in the jack actuating arm is withdrawn from the rearwardly extending arm of the jack and the jack moves to its forwardmost position.

It will be understood that the amounts and extents of the tipping movements of the leveling roll during the leveling operation depend upon the particular shape of template employed and that by selecting the proper shape, the tipping movements can be varied as desired. The eccentric 478 (Fig. 4) is arranged to move each of the jacks substantially from the position it is in when the leveling roll first engages the sole to the position it is in when the roll engages the sole in the vicinity of the heel breast line. It is desirable that upon leveling the toe end of the shoe the jack shall move relatively slowly so that this portion of the shoe which usually includes a greater thickness of material than the other portions shall have the maximum amount of treatment. The eccentric is therefore arranged to move the jack relatively slowly at this time; rapidly, while operating in the vicinity of the ball line; and slowly as the heel breast line approaches the leveling roll. Since it is desirable that the leveling operation in the vicinity of the ball line shall not be too rapid the cam 496 which cooperates with the eccentric 478 in moving the jack is arranged to slow down movement of the jack while operating in the vicinity of the ball line.

Having thus described my invention what I claim as new and desire to secure by Letters Patent of the United States is:

1. In a leveling machine, a leveling tool, a shoe support, power operated means for moving said shoe support rearwardly and forwardly beneath said leveling tool to cause the leveling tool to operate progressively along the forepart and shank portions of the bottom of a shoe, said power operated means including a power operated eccentric connected to said shoe support, and means for modifying the action of said eccentric to reduce the speed of movement of the shoe support at a point between its extreme positions to a speed below that which it would be moved by the eccentric.

2. In a leveling machine, a leveling tool, a shoe support, power operated means for moving said support rearwardly and forwardly beneath said leveling tool to cause the leveling tool to operate progressively along the forepart and shank portions of the bottom of a shoe, said power operated means including a power operated eccentric, and means connecting said eccentric and said shoe support to move the support rearwardly and forwardly, said last-named means including means for retarding the movements of the shoe support at a predetermined time in its rearward and forward movements between its extreme positions.

3. In a leveling machine, a leveling tool, a shoe support, power operated means for moving said support rearwardly and forwardly beneath said leveling tool to cause the leveling tool to operate progressively along the forepart and shank portions of the bottom of a shoe, said power operated means including a power operated eccentric, a crank, a lever connected to said crank, a power operated cam connected to said lever whereby the lever is moved by the conjoint action of said cam and said eccentric, and means connecting said lever to said shoe support.

4. In a leveling machine, a leveling tool and a shoe support relatively movable in opposite directions lengthwise of a shoe on the support to operate progressively along the shoe bottom, means mounting said leveling tool for tipping movements relatively to the shoe bottom, a shaft mounted for turning and axial movements, means for rotating said shaft during the leveling operation, means operated in response to axial movement of said shaft for tipping the leveling tool, a pair of oppositely threaded worms secured to said shaft, a worm gear in mesh with each of said worms, means mounting said worm gears for free rotation, and means for locking one or the other of said gears against rotation at predetermined times during the leveling operation to tip said leveling tool in one direction or the other, the direction and extent of tipping movement depending upon the direction and extent of axial movement of said shaft.

5. In a leveling machine, a leveling tool and a shoe support relatively movable in opposite directions lengthwise of a shoe on the support to operate progressively along the shoe bottom, means mounting said leveling tool for tipping movements relatively to the shoe bottom, a shaft mounted for turning and axial movements, means for rotating said shaft during the leveling operation, means operated in response to axial movement of said shaft for tipping the leveling tool, a pair of oppositely threaded worms secured to said shaft, a worm gear in mesh with each of said worms, means mounting said worm gears for free rotation, means for locking one or the other of said gears against rotation at predetermined times during the leveling operation to tip said leveling tool in one direction or the other, the direction and extent of tipping movement depending upon the direction and extent of axial movement of said shaft, and means including a removable template for controlling the locking of said worm gears according to a predetermined schedule depending upon the shape of said template.

6. In a leveling machine, a leveling tool and a shoe support relatively movable in opposite directions lengthwise of a shoe on the support to operate progressively along the shoe bottom, spring means urging said leveling tool into engagement with the bottom of the shoe, an adjusting member for predetermining the effectiveness of said spring means on the leveling tool to control the amount of pressure applied to the shoe bottom, and means preventing operation of said adjusting member during operation of the machine.

7. In a leveling machine, a leveling tool and a shoe support relatively movable in opposite directions lengthwise of a shoe on the support to operate progressively along the shoe bottom, spring means urging said leveling tool into engagement with the bottom of the shoe, a thrust member acting against said spring means to control the amount of pressure of the leveling tool against the shoe bottom, a lever acting through said thrust member and spring means to force the leveling tool against the shoe bottom, means for moving said thrust member along the lever to vary the effectiveness of said spring means, and means preventing operation of said last-named means during operation of the machine.

References Cited in the file of this patent

UNITED STATES PATENTS

| | | |
|---|---|---|
| 1,124,190 | Winkley | Jan. 5, 1915 |
| 1,434,424 | Baxter | Nov. 7, 1922 |
| 1,685,387 | Winkley et al. | Sept. 25, 1928 |
| 1,962,141 | Eppler | June 12, 1934 |
| 2,516,111 | Eppler | July 25, 1950 |

FOREIGN PATENTS

| | | |
|---|---|---|
| 399,528 | Germany | July 24, 1924 |